US012663695B2

(12) United States Patent
Lee et al.

(10) Patent No.: US 12,663,695 B2
(45) Date of Patent: Jun. 23, 2026

(54) CAMERA MODULE

(71) Applicant: SAMSUNG ELECTRO-MECHANICS CO., LTD., Suwon-si (KR)

(72) Inventors: Kyung Hun Lee, Suwon-si (KR); Soo Cheol Lim, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 191 days.

(21) Appl. No.: 18/587,176

(22) Filed: Feb. 26, 2024

(65) Prior Publication Data

US 2024/0310694 A1 Sep. 19, 2024

(30) Foreign Application Priority Data

Mar. 15, 2023 (KR) ......................... 10-2023-0034108
Sep. 4, 2023 (KR) ......................... 10-2023-0117213

(51) Int. Cl.
*G03B 9/18* (2021.01)
*G03B 17/12* (2021.01)
*H04N 23/57* (2023.01)

(52) U.S. Cl.
CPC ............... *G03B 9/18* (2013.01); *G03B 17/12* (2013.01); *H04N 23/57* (2023.01)

(58) Field of Classification Search
CPC .. G03B 9/18; G03B 17/12; G03B 2205/0069; H04N 23/57
See application file for complete search history.

(56) References Cited

U.S. PATENT DOCUMENTS

2015/0323758 A1* 11/2015 Lee .......................... G02B 7/04
359/824
2017/0324892 A1* 11/2017 Kim ....................... H04N 23/55
(Continued)

FOREIGN PATENT DOCUMENTS

KR 10-2010-0092820 A 8/2010
KR 10-1700771 B1 1/2017
(Continued)

OTHER PUBLICATIONS

Korean Office Action Issued on Nov. 1, 2025, in counterpart Korean Patent Application No. 10-2023-0117213 (5 Pages in English, 4 Pages in Korean).

*Primary Examiner* — Jason A Flohre
(74) *Attorney, Agent, or Firm* — NSIP Law

(57) ABSTRACT

A camera module including a lens module configured to move in one or more of an optical axis direction, a first axis direction perpendicular to the optical axis direction, and a second axis direction perpendicular to the optical axis direction and the first axis direction, a housing configured to accommodate the lens module, a printed circuit board coupled to the housing, an aperture module configured to form an incident opening of various sizes, and coupled to the lens module and moved together with the lens module, and a connection substrate connected to the printed circuit board and the aperture module. The aperture module includes an aperture driver including a magnet portion and a coil portion, and an aperture substrate in which the coil portion is disposed, and one side of the connection substrate is coupled to the aperture substrate, and another side thereof is coupled to the printed circuit board.

22 Claims, 24 Drawing Sheets

(56)  References Cited

U.S. PATENT DOCUMENTS

| | | | | |
|---|---|---|---|---|
| 2019/0204532 A1* | 7/2019 | Konuma | ............. | G02B 27/646 |
| 2019/0373145 A1* | 12/2019 | Yu | .......................... | G02B 7/102 |
| 2022/0132003 A1* | 4/2022 | Huang | ................. | F03G 7/0665 |
| 2022/0196888 A1* | 6/2022 | Park | ..................... | G02B 26/004 |
| 2022/0196968 A1* | 6/2022 | Lee | ........................ | H04N 23/55 |
| 2024/0061317 A1* | 2/2024 | You | .......................... | G03B 3/10 |

FOREIGN PATENT DOCUMENTS

| | | | |
|---|---|---|---|
| KR | 10-2018-0105970 A | 10/2018 | |
| KR | 10-2021-0002273 A | 1/2021 | |
| KR | 10-2404860 B1 | 6/2022 | |

* cited by examiner

I-I'

II–II'

III-III'

CAMERA MODULE

CROSS-REFERENCE TO RELATED APPLICATIONS

This application claims the benefit under 35 USC 119(a) of Korean Patent Application Nos. 10-2023-0034108 filed on Mar. 15, 2023, and 10-2023-0117213 filed on Sep. 4, 2023, in the Korean Intellectual Property Office, the entire disclosures of which are incorporated herein by reference for all purposes.

BACKGROUND

1. Field

The following description relates to a camera module.

2. Description of the Background

A camera module may be adopted in a portable electronic device such as a smartphone, a tablet PC, and a laptop computer.

Furthermore, an aperture module may be configured to control the amount of light incident therethrough as applied to a mobile camera module.

The aperture module may include an aperture driver configured to change the size of an incident opening through which light passes, and the aperture driver may include a magnet and a coil. Furthermore, the coil may be fixed to a housing of the camera module.

A lens module of the camera module may be moved for focus adjustment and shake correction, and in this case, in a structure in which the aperture module is fixed, since a gap between the lens module and the aperture module changes, it may be difficult to satisfy desired driving characteristics.

Furthermore, even if the aperture module is configured to move along with the lens module, because a gap between the magnet and the coil of the aperture driver changes, it may be difficult to satisfy desired driving characteristics.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module configured to move in one or more of an optical axis direction, a first axis direction perpendicular to the optical axis direction, and a second axis direction perpendicular to both the optical axis direction and the first axis direction, a housing configured to accommodate the lens module, a printed circuit board coupled to the housing, an aperture module configured to form an incident opening of various sizes, and coupled to the lens module and moved together with the lens module, and a connection substrate connected to the printed circuit board and the aperture module. The aperture module includes an aperture driver including a magnet portion and a coil portion, and an aperture substrate in which the coil portion is disposed, and one side of the connection substrate is coupled to the aperture substrate, and another side thereof is coupled to the printed circuit board.

The connection substrate may include a fixed portion fixed to the housing, a moving portion connected to the aperture substrate, and a support portion connecting the fixed portion and the moving portion.

The support portion may be disposed between the fixed portion and the moving portion, may extend along a circumferential surface of at least a portion of the moving portion, and may have a shape that is curved at least once.

Connection pads may be disposed on the aperture substrate and the moving portion, respectively, and the connection pad of the aperture substrate and the connection pad of the moving portion may be solder-bonded to each other.

The camera module may further include a case coupled to the housing, and the fixed portion may be mounted on the case.

The connection substrate may further include a connection portion mounted on an internal surface of the case, and a bent portion connecting the connection portion to the fixed portion, and the bent portion may be spaced apart from the case and may have a curved shape providing curvature.

The case may include a step portion formed on an upper surface thereof, and the step portion may have a surface facing at least a portion of the support portion in the optical axis direction.

The camera module may further include a carrier having the lens module disposed therein, and accommodated in the housing, a first stopper coupled to the carrier, and disposed to cover at least a portion of the lens module, and a second stopper coupled to the housing, and disposed to cover at least a portion of the first stopper.

At least a portion of the first stopper may face the support portion downwardly in the optical axis direction.

The lens module may include a lens barrel and a lens holder coupled to the lens barrel. A first bonding groove and a second bonding groove may be disposed on an internal surface of the lens holder, and a partition wall may be disposed between the first bonding groove and the second bonding groove.

The lens barrel may be bonded to the lens holder by an adhesive applied to the first bonding groove.

The aperture module may be bonded to the lens barrel and the lens holder by an adhesive applied to the second bonding groove.

A lower surface of the aperture module may be bonded to an upper surface of the lens barrel through the adhesive.

The aperture module may include a support protrusion extending in the optical axis direction and disposed in the second bonding groove, and the support protrusion may be spaced apart from an internal surface of the second bonding groove and an external surface of the lens barrel while being disposed in the second bonding groove.

The aperture module and the lens module may move together in the optical axis direction, the first axis direction, and the second axis direction.

An image sensor may be disposed on the printed circuit board, and at least a portion of the connection substrate may be flexible.

In another general aspect, a camera module includes a lens module configured to move in one or more of an optical axis direction, a first axis direction perpendicular to the optical axis direction, and a second axis direction perpendicular to both the optical axis direction and the first axis direction, a housing configured to accommodate the lens module, a case coupled to the housing, an aperture module configured to form an incident opening of various sizes, and coupled to the lens module and moved together with the lens module, and a connection substrate including a moving portion coupled to the aperture module, a fixed portion coupled to the case, and a support portion connecting the moving portion to the fixed portion.

The connection substrate may further include a connection portion extending downwardly in the optical axis direction and a bent portion connecting the connection portion to the fixed portion, and the bent portion may be spaced apart from the case and may have a curved shape providing curvature.

The camera module may further include a printed circuit board coupled to the housing and having an image sensor disposed therein, and an end of the connection portion may be coupled to the printed circuit board.

The camera module may further include: a carrier having the lens module disposed therein, and accommodated in the housing, a first stopper coupled to the carrier, and disposed to cover at least a portion of the lens module, and a second stopper coupled to the housing, and disposed to cover at least a portion of the first stopper. At least a portion of the first stopper may be disposed to face the support portion in the optical axis direction, and at least a portion of the second stopper may be disposed to face the fixed portion in the optical axis direction.

The case may include a step portion formed on an upper surface thereof, and the step portion may have a surface facing at least a portion of the support portion in the optical axis direction.

In another general aspect, a camera module includes a lens module, an aperture module configured to form an incident opening of various sizes, and disposed on the lens module, and a connection substrate comprising a fixed portion, a moving portion coupled to the aperture module and configured to move relative to the fixed portion, and a support portion connecting the moving portion to the fixed portion.

The lens module may be configured to move in one or more of an optical axis direction, a first axis direction perpendicular to the optical axis direction, and a second axis direction perpendicular to both the optical axis direction and the first axis direction.

The camera module may further include a housing configured to accommodate the lens module, and a printed circuit board coupled to the housing, wherein the aperture module may include an aperture driver including a magnet portion and a coil portion, and an aperture substrate in which the coil portion is disposed, and one side of the connection substrate may be coupled to the aperture substrate, and another side thereof may be coupled to the printed circuit board.

Other features and aspects will be apparent from the following detailed description, the drawings, and the claims.

Figure 1:
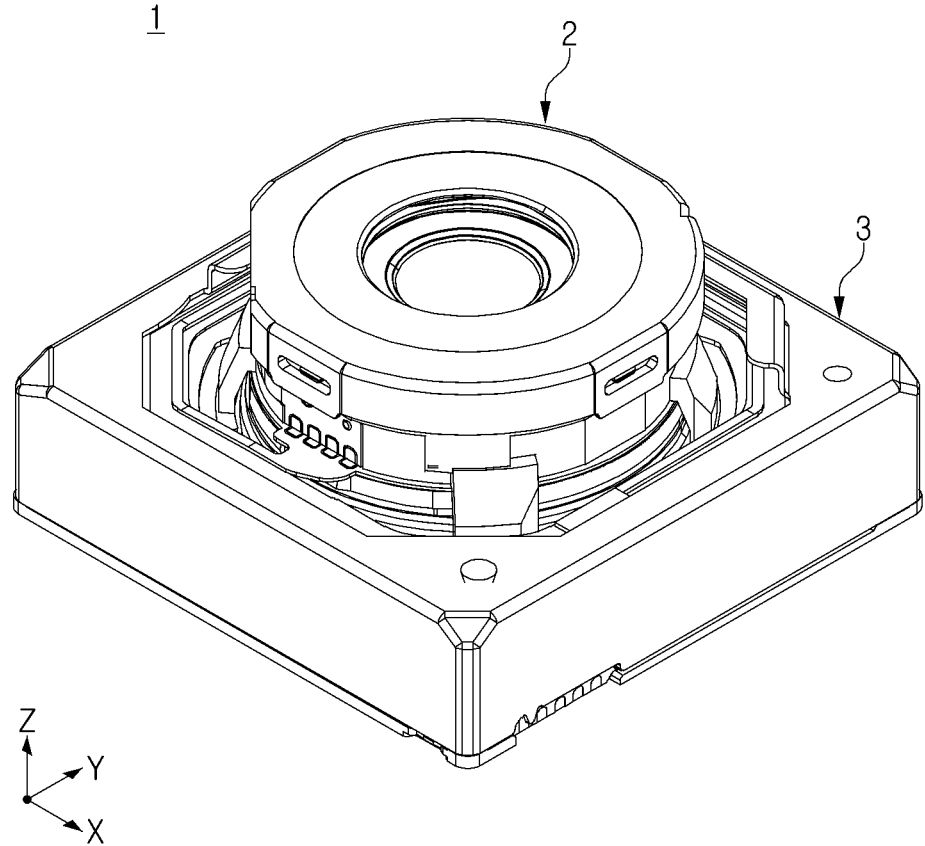
FIG. 1 is a perspective view of a camera module according to an example embodiment of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide a camera module with improved driving reliability.

A camera module according to an embodiment of the present disclosure may improve driving reliability.

The present disclosure relates to a camera module, the camera module may be mounted on a portable electronic device such as a mobile communication terminal, a smartphone, a tablet PC, and the like.

Figure 2:
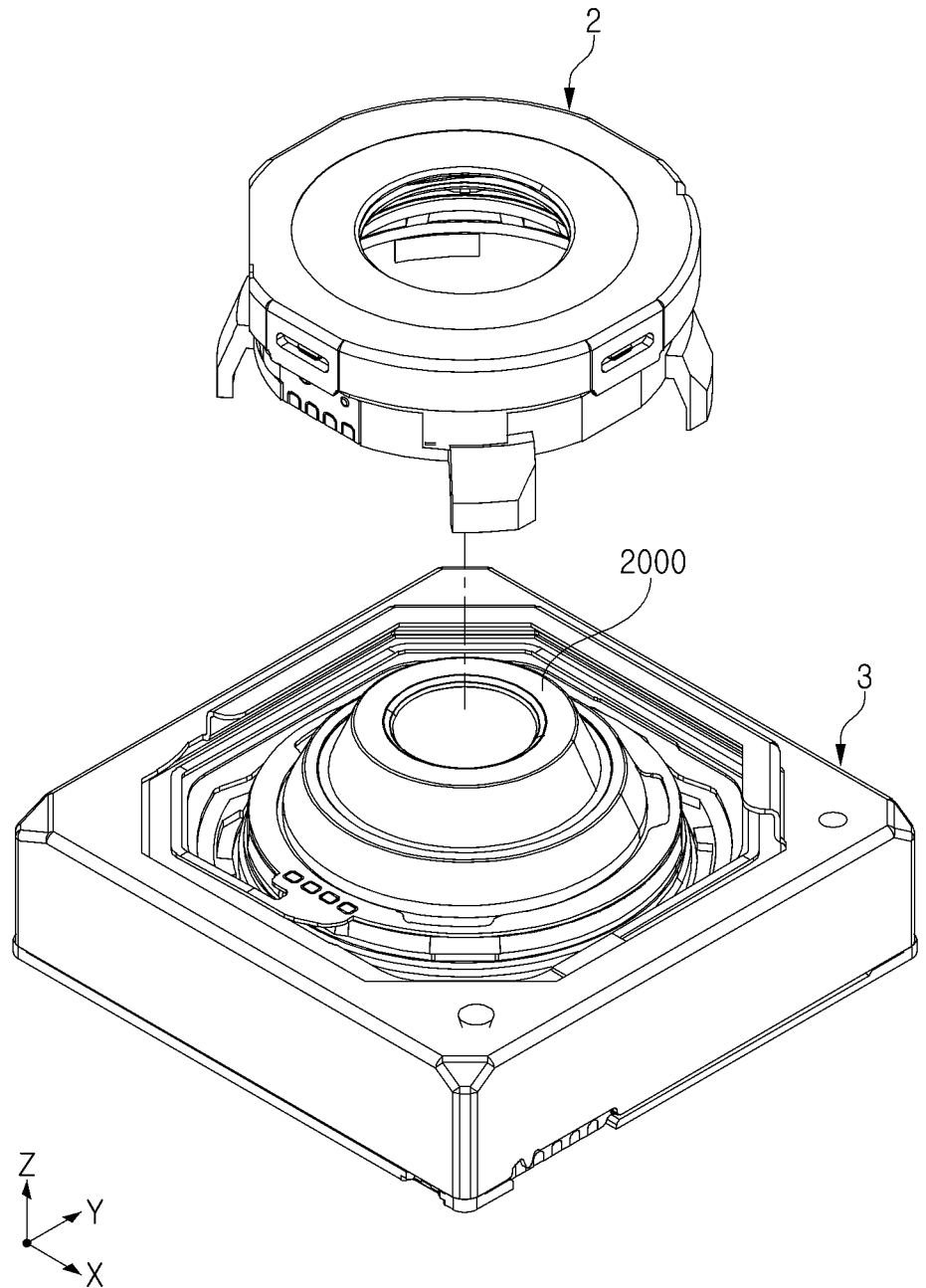
FIG. 2 is a perspective view illustrating a state in which an aperture module and a camera actuator are separated.

FIG. 1 is a perspective view of a camera module according to an example embodiment of the present disclosure, and FIG. 2 is a perspective view illustrating a state in which an aperture module and a camera actuator are separated.

Referring to FIGS. 1 and 2, a camera module 1 according to an example embodiment of the present disclosure includes an aperture module 2 and a camera actuator 3.

The camera actuator 3 includes a housing 1100 (FIG. 12) having an internal space, and a lens module 2000 disposed in the housing 1100. The lens module 2000 may be moved in an optical axis (Z-axis) direction for focus adjustment. Furthermore, the lens module 2000 may be moved in a direction perpendicular to an optical axis (Z-axis) for shake correction.

The aperture module 2 may be coupled to the camera actuator 3 and may control the amount of light incident on the camera actuator 3. For example, the aperture module 2 may have an incident opening 210 (FIG. 5) through which light passes, and may adjust the amount of light incident on the camera actuator 3 by changing a size of the incident opening 210.

The aperture module 2 may be coupled to the lens module 2000 and configured to move along with the lens module 2000. In another example embodiment, the aperture module 2 may be fixed to the housing 1100.

Figure 3:
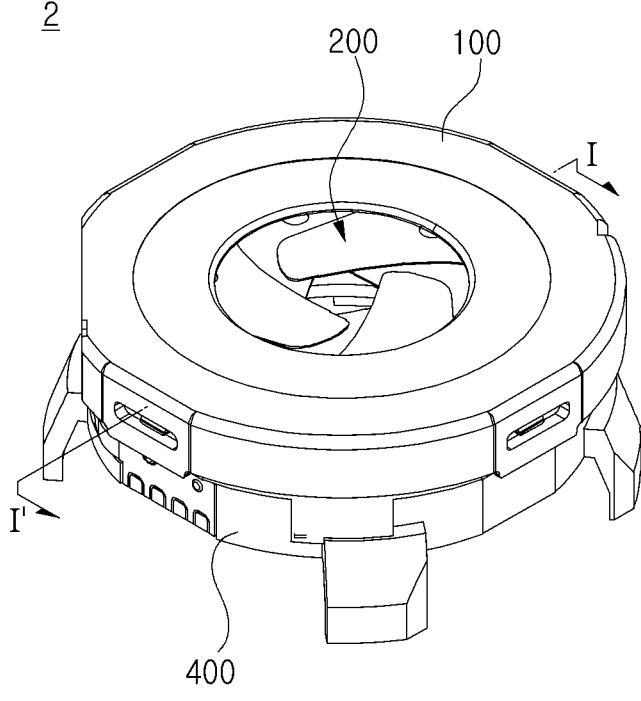
FIG. 3 is a perspective view illustrating a state in which an aperture module according to an example embodiment of the present disclosure has a relatively narrow incident opening.
Figure 4:
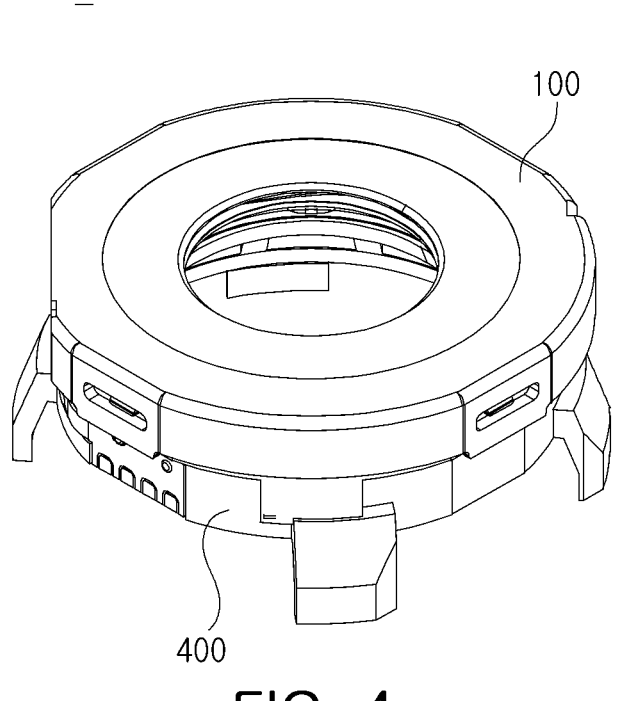
FIG. 4 is a perspective view illustrating a state in which the aperture module according to an example embodiment of the present disclosure has a relatively large incident opening.

FIG. 3 is a perspective view illustrating a state in which an aperture module according to an example embodiment of the present disclosure has a relatively narrow incident opening, and FIG. 4 is a perspective view illustrating a state in which the aperture module according to an example embodiment of the present disclosure has a relatively large incident opening.

Figure 5:
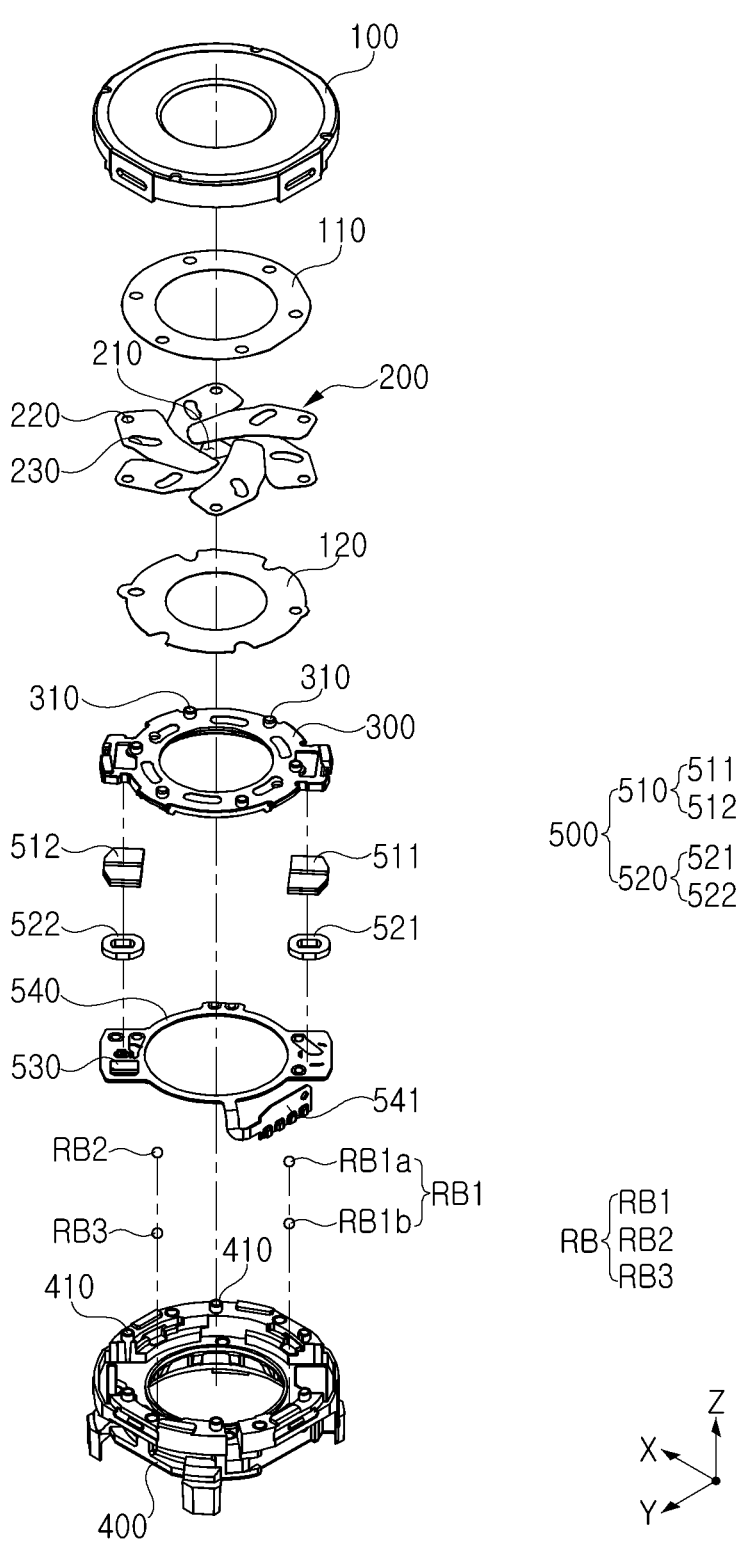
FIG. 5 is an exploded perspective view of FIG. 3.
Figure 6:
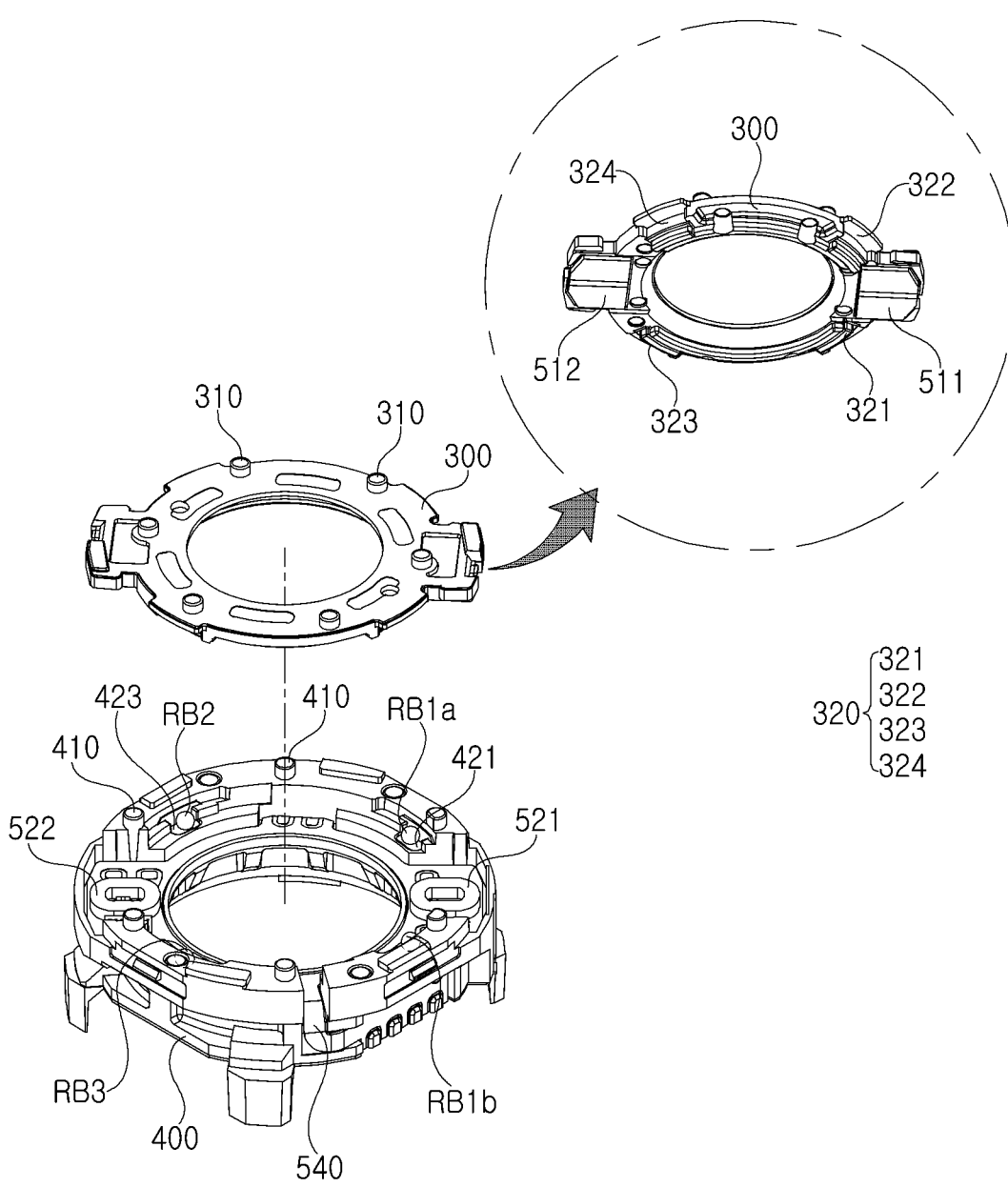
FIG. 6 is an exploded perspective view illustrating a form in which an aperture driver is disposed on a base and a rotating body.

Furthermore, FIG. 5 is an exploded perspective view of FIG. 3, and FIG. 6 is an exploded perspective view illustrating a form in which an aperture driver is disposed on a base and a rotating body.

Referring to FIGS. 3 to 6, the aperture module 2 according to an example embodiment of the present disclosure includes a base 400, a rotating body 300, a plurality of blades 200, and an aperture driver 500.

The base 400 may be coupled to the camera actuator 3. For example, the base 400 may be coupled to a lens module 2000 of the camera actuator 3. In this case, the aperture module 2 may be moved, along with the lens module 2000 as the lens module 2000 is moved.

The rotating body 300 may be rotated relative to the base 400. For example, the rotating body 300 may be spaced apart from the base 400 in the optical axis (Z-axis) direction and rotated relative to the base 400. As the rotating body 300 rotates, a size of an incident opening 210 of the aperture module 2 may change.

A plurality of blades 200 may form the incident opening 210. A portion of each blade may be disposed to overlap other blades in the optical axis (Z-axis) direction. For example, one set of a plurality of blades (e.g., three blades) and another set of a plurality of blades (e.g., three blades) may be sequentially disposed in the optical axis (Z-axis) direction. Here, a portion of one blade may be disposed to overlap the other two blades in the optical axis (Z-axis) direction.

This example embodiment is described as having a structure in which a total of six blades are provided and three blades form a set, and two sets of blades are stacked in two layers, but the number of blades 200 is not limited thereto.

The incident opening 210 may be defined by surfaces of each blade oriented toward the optical axis (Z-axis). A position of each blade may be changed by the aperture driver 500.

Accordingly, the size of the incident opening 210 may change depending on the position of each blade.

For example, as illustrated in FIGS. 3 and 4, the size of the incident opening 210 may decrease or increase according to the rotation of each blade.

The plurality of blades 200 are coupled to the base 400 and the rotating body 300. Since each blade may have the same shape, one blade will be described below.

The blade includes a through-opening 220. For example, the blade has the through-opening 220 at an external end thereof, and the through-opening 220 has a shape that penetrates through the blade in the optical axis (Z-axis) direction.

The through-opening 220 of the blade is coupled to the base 400. For example, a protrusion 410 protruding in the optical axis (Z-axis) direction is disposed in the base 400, and the protrusion 410 is coupled to the through-opening 220 of the blade. Similarly with the plurality of blades 200, the protrusion 410 may be provided in plural form.

The protrusion 410 forms a rotation axis of the blade. The protrusion 410 and the through-opening 220 have sizes corresponding to each other.

Furthermore, the blade includes a guide opening 230. For example, the blade has a guide opening 230 disposed in a position spaced apart from the through-opening 220.

The guide opening 230 of the blade is coupled to the rotating body 300. For example, a guide protrusion 310 protruding in the optical axis (Z-axis) direction is disposed on the rotating body 300, and the guide protrusion 310 is coupled to the guide opening 230 of the blade. Similarly with the plurality of blades 200, the guide protrusion 310 may be provided in plural form.

The guide opening 230 has a larger size than the guide protrusion 310. For example, a width of the guide opening 230 corresponds to a diameter of the guide protrusion 310, and a length of the guide opening 230 is larger than the diameter of the guide protrusion 310.

The shape of the guide opening 230 is not limited thereto. For example, as long as the guide opening 230 has a structure capable of moving a position of the blade in conjunction with a movement of the rotating body 300, the shape of the guide opening 230 may be changed.

Accordingly, with the rotation of the rotating body 300, the guide protrusion 310 may move in the guide opening 230, and accordingly, the blade may be rotated using the protrusion 410 of the base 400 as a rotation axis.

The aperture module 2 according to an example embodiment of the present disclosure may further include a cover 100. The cover 100 is coupled to base 400. A plurality of blades 200 and the rotating body 300 may be disposed in a space between the cover 100 and the base 400.

A first spacer 110 may be disposed between the plurality of blades 200 and the cover 100. For example, the first spacer 110 is coupled to the rotating body 300 and may be disposed between the plurality of blades 200 and the cover 100. The first spacer 110 may cover at least a portion of an upper surface of the plurality of blades 200. A surface of the first spacer 110 may be coated in black.

The first spacer 110 has a through-opening through which light passes, and a size of the through-opening of the first spacer 110 may be larger than a maximum size of the incident opening 210 formed by the plurality of blades 200.

A second spacer 120 may be disposed between the rotating body 300 and the plurality of blades 200. For example, the second spacer 120 may be coupled to the rotating body 300 and may be disposed between the rotating body 300 and the plurality of blades 200. The second spacer 120 may cover at least a portion of a lower surface of the plurality of blades 200. A surface of the second spacer 120 may be coated in black.

The second spacer 120 has a through-opening through which light passes, and a size of the through-opening of the second spacer 120 may be larger than a maximum size of the incident opening 210 formed by the plurality of blades 200. Furthermore, the size of the through-opening of the second spacer 120 may be smaller than the size of the through-opening of the first spacer 110.

The aperture driver 500 may move the rotating body 300 to change the size of the incident opening 210. For example, the aperture driver 500 may generate driving force to rotate the rotating body 300.

With the rotation of the rotating body 300, the guide protrusions 310 of the rotating body 300 move in the guide openings 230 of the plurality of blades 200, and accordingly, the blades 200 may rotate with the protrusions 410 of the base 400 as rotation axes, thus changing a size of the incident opening 210.

The aperture driver 500 includes a magnet portion 510 and a coil portion 520. The magnet portion 510 and the coil portion 520 may be disposed to face each other in the optical axis (Z-axis) direction.

The magnet portion 510 may be disposed in one of the rotating body 300 and the base 400, and the coil portion 520 may be disposed on the other one thereof.

For example, the magnet portion 510 may be mounted on the rotating body 300. As an example, the magnet portion 510 may be mounted on a lower surface of the rotating body 300.

The magnet portion 510 may include a plurality of aperture magnets spaced apart from each other. As an example, the magnet portion 510 may include a first aperture magnet 511 and a second aperture magnet 512 disposed opposite to each other with respect to the optical axis (the Z-axis).

The first and second aperture magnets 511 and 512 may be magnetized so that one surface thereof (e.g., a surface facing the coil portion 520) has both an N-pole and an S-pole, respectively. As an example, one side of the first and second aperture magnets 512 facing the coil portion 520 may be provided with an N-pole, a neutral region, and an S-pole sequentially in a direction perpendicular to the optical axis (e.g., a rotation direction of the rotating body 300).

The coil portion 520 is arranged to face the magnet portion 510. For example, the coil portion 520 may be disposed to face the magnet portion 510 in the optical axis (Z-axis) direction.

The coil portion 520 is disposed on an aperture substrate 540, and the aperture substrate 540 is mounted in the base 400 so that the magnet portion 510 and the coil portion 520 face each other in the optical axis (Z-axis) direction. As an example, the coil portion 520 may be disposed on one surface of the aperture substrate 540. The aperture substrate 540 is mounted on an upper surface of the base 400.

Furthermore, the aperture substrate 540 may include a first extension portion 541 extending from the upper surface of the base 400 to a side surface of the base 400. The first extension portion 541 may be connected to a connection substrate 8000 to be described below.

The coil portion 520 may include a plurality of aperture coils. As an example, the coil portion 520 may include a first aperture coil 521 and a second aperture coil 522 disposed opposite to each other with respect to the optical axis (Z-axis).

The magnet portion 510 is a moving member mounted on the rotating body 300 and rotating, along with the rotating body 300, and the coil portion 520 is a fixed member fixed to the base 400.

In another example embodiment, the magnet portion 510 and the coil portion 520 may also be disposed opposite to each other. In this case, because the coil portion 520 and the aperture substrate 540 are mounted in the rotating body 300 and rotate, along with the rotating body 300, at least a portion of the aperture substrate 540 may be configured to be flexible.

When power is applied to the coil portion 520, the rotating body 300 may be rotated by electromagnetic force between the magnet portion 510 and the coil portion 520.

In this example embodiment, the aperture driver 500 (e.g., the magnet portion 510) rotates, thus rotating the rotating body 300.

In contrast, in a case in which the magnet is linearly moved and the linear movement of the magnet is changed to a rotational movement of the rotating body, when the power source is not applied, unfortunately, the size of the incident opening may be changed as the rotating body is rotated by external force.

However, in an example embodiment, because the center of gravity of the aperture driver 500 (e.g., the magnet portion 510) is disposed inside a rotating radius of the rotating body 300, even if the external force is applied, the rotating body 300 does not rotate.

A rolling portion RB is disposed between the base 400 and the rotating body 300. For example, the rolling portion RB may be disposed between the base 400 and the rotating body 300 to reduce friction when the rotating body 300 rotates.

The rolling portion RB includes a plurality of rolling balls spaced apart from each other in a circumferential direction of the rotating body 300. When the rotating body 300 rotates, the plurality of rolling balls may roll in the rotation direction of the rotating body 300. The rolling portion RB may include three or more rolling balls. In this example embodiment, the rolling portion RB is described as including four rolling balls, but the number of rolling balls is not limited as long as there are three or more rolling balls.

A pulling yoke portion 550 is disposed on the base 400. The pulling yoke portion 550 may be disposed in a position facing the magnet portion 510 in the optical axis (Z-axis) direction.

The pulling yoke portion 550 may be integrally coupled to the base 400 by insert injection. In this case, the pulling yoke portion 550 may be manufactured to be integrated with the base 400 by injecting a resin material into a mold in a state in which the pulling yoke portion 550 is fixed in the mold.

The pulling yoke portion 550 and the magnet portion 510 may generate attractive force therebetween. For example, the pulling yoke portion 550 may be a magnetic material. The attractive force acts in the optical axis (Z-axis) direction between the magnet portion 510 and the pulling yoke portion 550.

The rolling portion RB may be in contact with the base 400 and the rotating body 300, respectively, due to the attractive force of the magnet portion 510 and the pulling yoke portion 550.

The pulling yoke portion 550 includes a first pulling yoke 551 and a second pulling yoke 552. The first pulling yoke 551 faces the first aperture magnet 511 in the optical axis (Z-axis) direction, and the second pulling yoke 552 faces the second aperture magnet 512 in the optical axis (Z-axis) direction.

Figure 7:
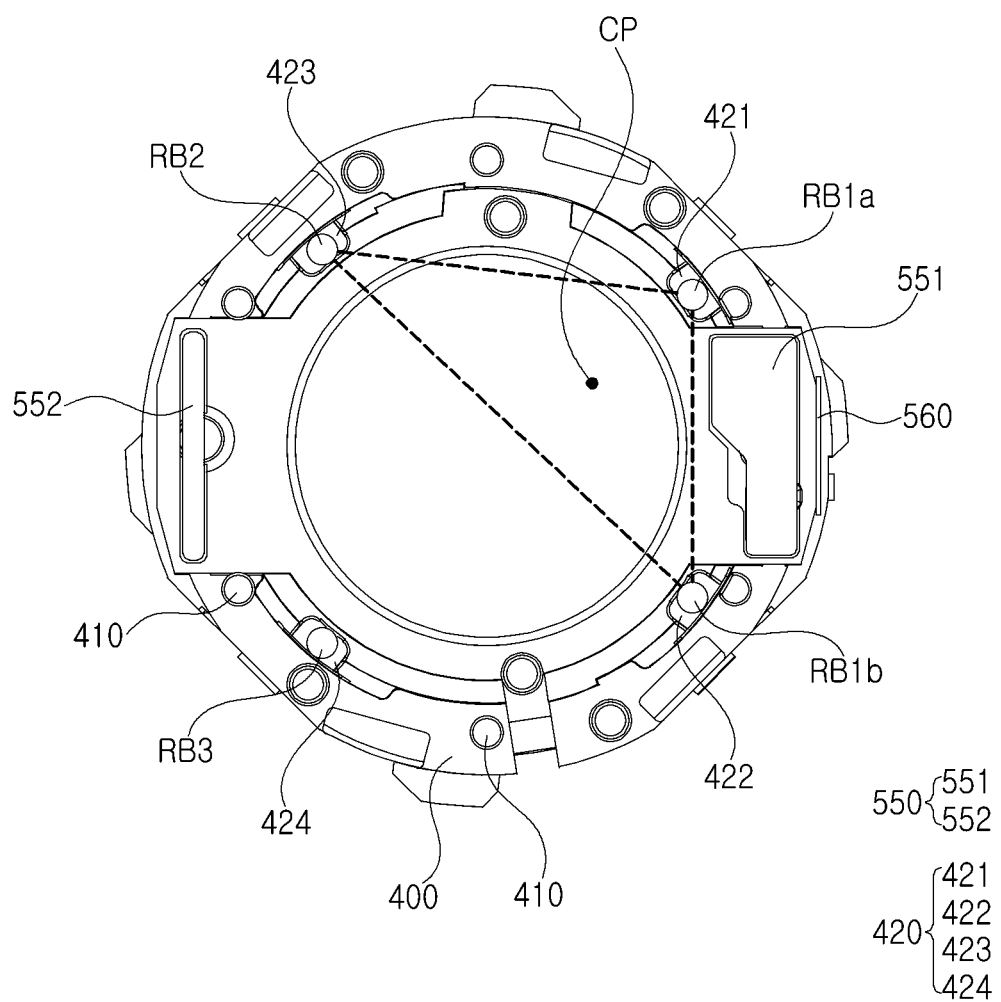
FIG. 7 is a plan view illustrating a state in which a rolling portion is disposed on a base.
Figure 8:
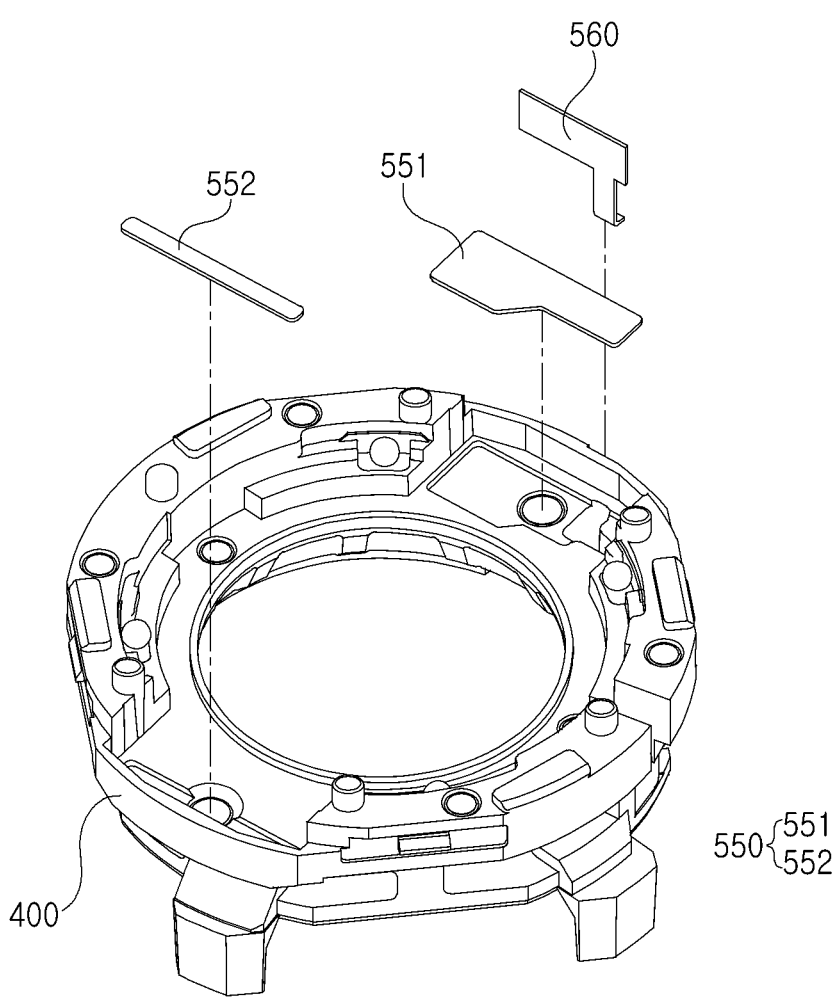
FIG. 8 is a perspective view illustrating a state in which a pulling yoke portion and an auxiliary yoke are separated from the base.
Figure 9:
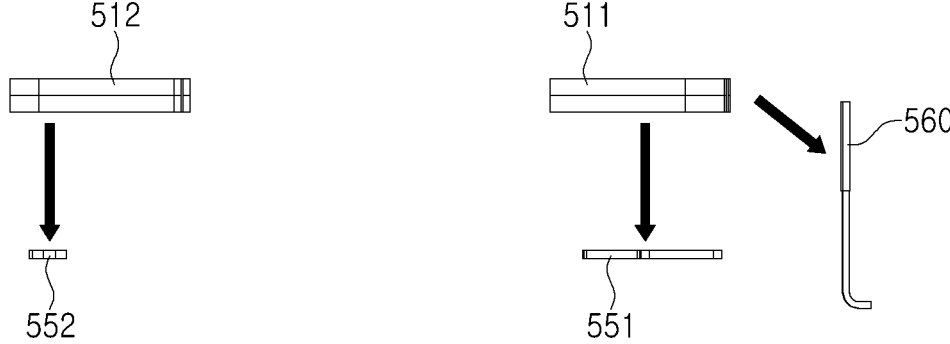
FIG. 9 is a side view schematically illustrating an arrangement form of a magnet portion, a pulling yoke portion and an auxiliary yoke.

FIG. 7 is a plan view illustrating a state in which a rolling portion is disposed on a base, FIG. 8 is a perspective view illustrating a state in which a pulling yoke portion and an auxiliary yoke are separated from the base, FIG. 9 is a side view schematically illustrating an arrangement form of a magnet portion, a pulling yoke portion and an auxiliary yoke.

Figure 10:
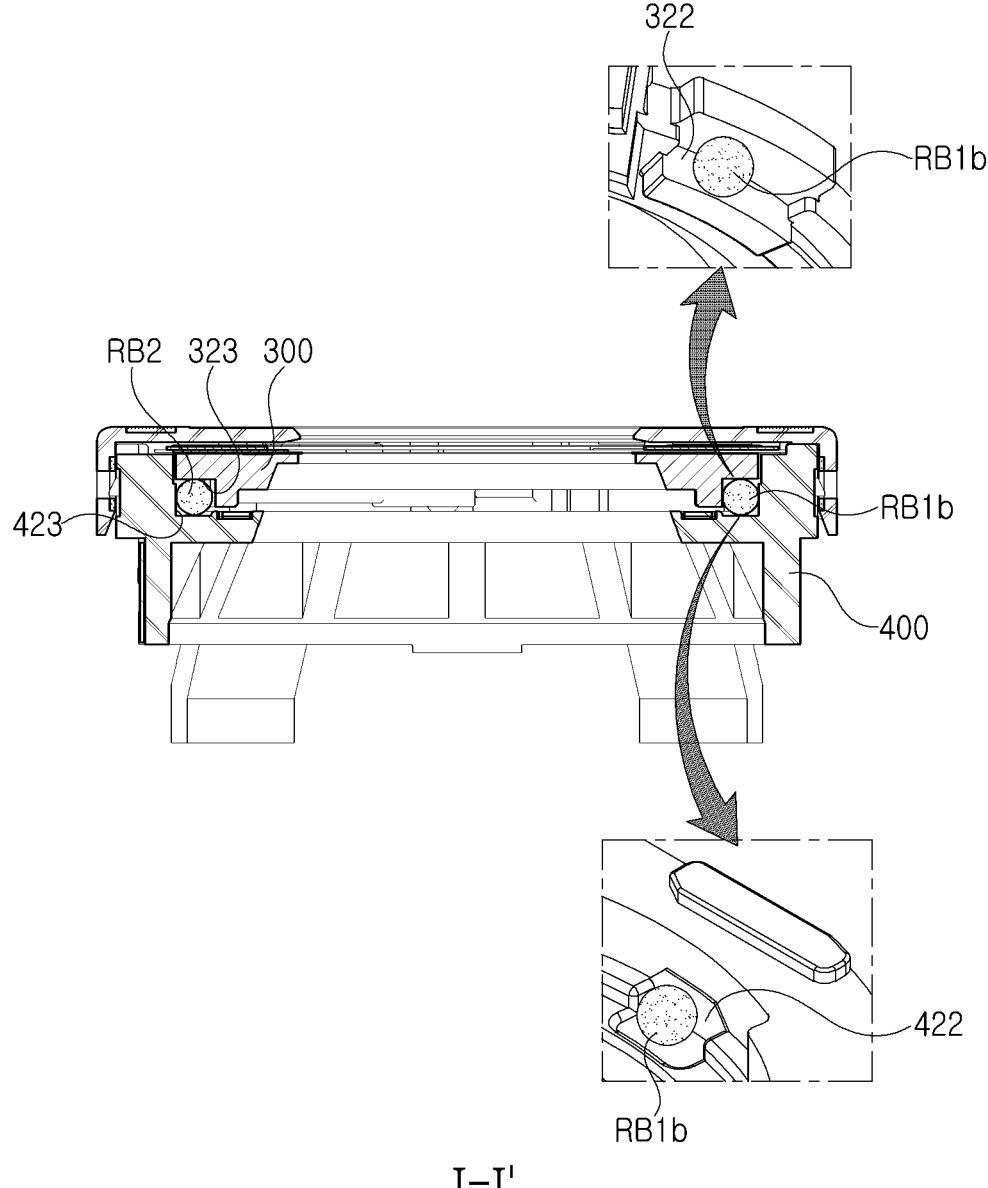
FIG. 10 is a cross-sectional view taken along line I-I' of FIG. 3.
Figure 11:
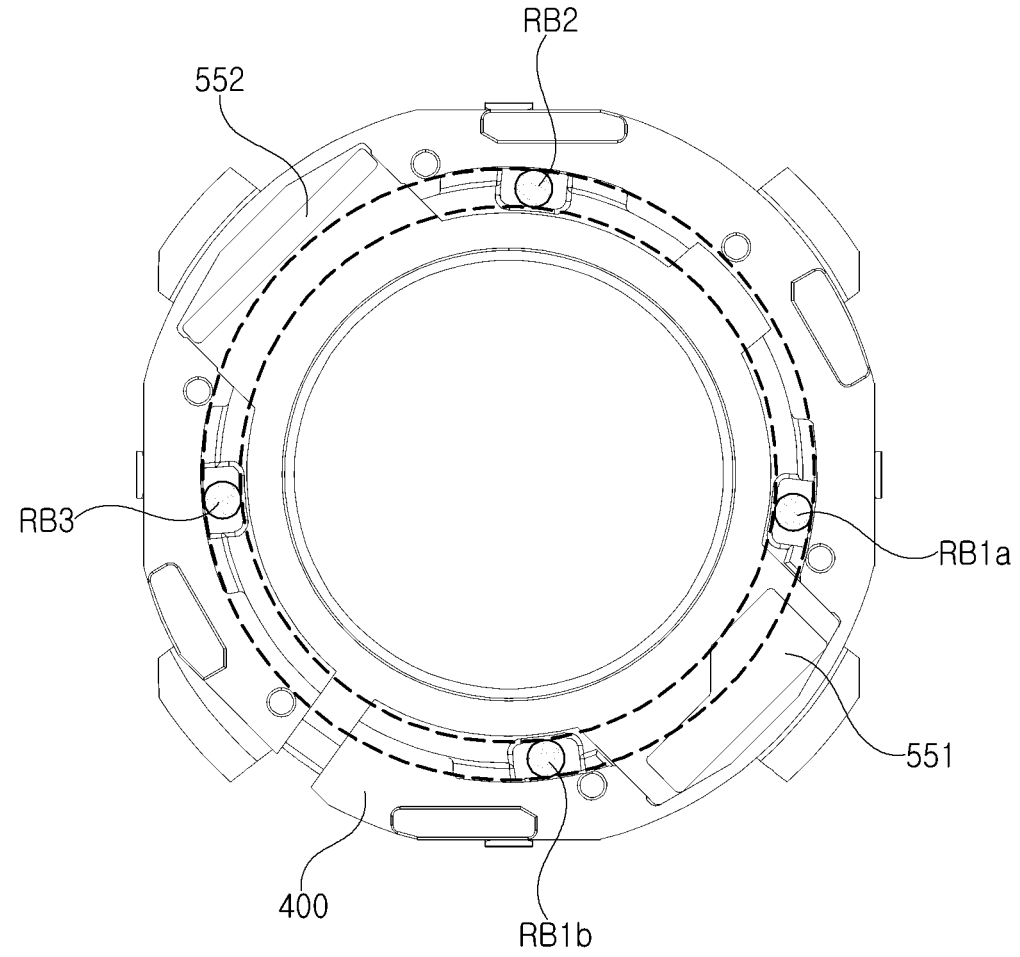
FIG. 11 is a plan view illustrating a guide groove in which a rolling portion is disposed.

Furthermore, FIG. 10 is a cross-sectional view taken along line I-I' of FIG. 3, and FIG. 11 is a plan view illustrating a guide groove in which a rolling portion is disposed.

Referring to FIG. 7, the rolling portion RB includes a first rolling member RB1 and a second rolling member RB2, and may further include a third rolling member RB3. The first to third rolling members RB1, RB2 and RB3 are spaced apart from each other in a circumferential direction of the base 400.

The first to third rolling members RB1, RB2 and RB3 may each include one or more rolling balls.

The number of rolling balls included in the first rolling member RB1 may be greater than the number of rolling balls included in the second rolling member RB2. Furthermore, the number of rolling balls included in the first rolling member RB1 may be greater than the number of rolling balls included in the third rolling member RB3.

According to an example embodiment, the first rolling member RB1 includes at least two rolling balls spaced apart along the circumferential direction of the base 400. For example, the first rolling member RB1 includes a first rolling ball RB1a and a second rolling ball RB1b. The second rolling member RB2 includes one rolling ball (e.g., a third rolling ball), and the third rolling member RB3 includes at least one rolling ball (e.g., a fourth rolling ball).

The first rolling member RB1 is disposed closer to the first aperture magnet 511 than the second aperture magnet 512. The second rolling member RB2 is disposed closer to the second aperture magnet 512 than the first aperture magnet 511. A relative position of the third rolling member RB3 with respect to the magnet portion 510 is not particularly limited.

Guide groove portions may be disposed on surfaces on which the base 400 and the rotating body 300 face each other, respectively. For example, a first guide groove portion 420 may be disposed in the base 400, and a second guide groove portion 320 may be disposed in the rotating body 300.

The rolling portion RB is disposed between the first guide groove portion 420 and the second guide groove portion 320. The first guide groove portion 420 includes a first-first guide groove 421, a first-second guide groove 422, a first-third guide groove 423, and a first-fourth guide groove 424. The first-first guide groove 421 to the first-fourth guide groove 424 are spaced apart from each other in the circumferential direction of the base 400.

Each of the first-first guide groove 421 to the first-fourth guide groove 424 includes a bottom surface formed on one surface (e.g., an upper surface) of the base 400, and a side surface extending from the bottom surface in the optical axis (Z-axis) direction. For example, each of the first-first guide groove 421 to the first-fourth guide groove 424 may have a substantially '⌊' shaped cross-section.

The second guide groove portion 320 includes a second-first guide groove 321, a second-second guide groove 322, a second-third guide groove 323, and a second-fourth guide groove 324. The second-first guide groove 321 to the second-fourth guide groove 324 are spaced apart from each other in the circumferential direction of the rotating body 300.

Each of the second-first guide groove 321 to the second-fourth guide groove 324 includes a bottom surface formed on one surface (e.g., a lower surface) of the rotating body 300 and a side surface extending from the bottom surface in the optical axis (Z-axis) direction. For example, each of the second-first guide groove 321 to the second-fourth guide groove 324 may have a substantially '⌉' shaped cross-section.

The first-first guide groove 421 and the second-first guide groove 321 are disposed to face each other, and one (e.g., the first rolling ball RB1a) of two rolling balls of the first rolling member RB1 is disposed in a space between the first-first guide groove 421 and the second-first guide groove 321.

A bottom surface of the first-first guide groove 421 and a bottom surface of the second-first guide groove 321 face each other in the optical axis (Z-axis) direction, and a side surface of the first-first guide groove 421 and a side surface of the second-first guide groove 321 face each other in a direction perpendicular to the optical axis (Z-axis).

Furthermore, the first-second guide groove 422 and the second-second guide groove 322 are disposed to face each other, and the other one of the two rolling balls of the first rolling member RB1b is disposed in a space between the first-second guide groove 422 and the second-second guide groove 322.

A bottom surface of the first-second guide groove 422 and a bottom surface of the second-second guide groove 322 face each other in the optical axis (Z-axis) direction, and a side surface of the first-second guide groove 422 and a side surface of the second-second guide groove 322 face each other in a direction perpendicular to the optical axis (Z-axis).

The first rolling ball RB1a of the first rolling member RB1 is in two-point contact with the first-first guide groove 421 and the second-first guide groove 321, respectively.

For example, the first rolling ball RB1a is in two-point contact with the first-first guide groove 421 and is in two-point contact with the second-first guide groove 321. For example, the first rolling ball RB1a is in contact with the bottom surface and the side surface of the first-first guide groove 421, and is in contact with the bottom surface and the side surface of the second-first guide groove 321.

A contact point of the bottom surface of the first-first guide groove 421 and a contact point of the bottom surface of the second-first guide groove 321 face each other in the optical axis (Z-axis) direction, and a contact point of the side surface of the first-first guide groove 421 and a contact point of the side surface of the second-first guide groove 321 face each other in a direction perpendicular to the optical axis (Z-axis).

For example, a virtual line for connecting the contact point of the bottom surface of the first-first guide groove 421 and the contact point of the bottom surface of the second-first guide groove 321, and a virtual line for connecting the contact point of the side surface of the first-first guide groove 421 and the contact point of the side surface of the second-first guide groove 321 may have a substantially '+' shape.

The second rolling ball RB1b of the first rolling member RB1 is in two-point contact with the first-second guide groove 422 and the second-second guide groove 322, respectively.

For example, the second rolling ball RB1b is in two-point contact with the first-second guide groove 422 and is in two-point contact with the second-second guide groove 322. For example, the second rolling ball RB1b is in contact with the bottom surface and the side surface of the first-second guide groove 422, and is in contact with the bottom surface and the side surface of the second-second guide groove 322.

The contact point of the bottom surface of the first-second guide groove 422 and the contact point of the bottom surface of the second-second guide groove 322 face each other in the optical axis (Z-axis) direction, and the contact point of the side surface of the first-second guide groove 422 and the contact point of the side surface of the second-second guide groove 322 face each other in a direction perpendicular to the optical axis (Z-axis).

For example, a virtual line for connecting the contact point of the bottom surface of the first-second guide groove 422 and the contact point of the bottom surface of the second-second guide groove 322, and a virtual line for connecting the contact point of the side surface of the first-second guide groove 422 and the contact point of the side surface of the second-second guide groove 322 may have a substantially '+' shape.

The first rolling member RB1, the first-first guide groove 421, the first-second guide groove 422, the second-first guide groove 321, and the second-second guide groove 322 may function as a main guide for guiding the rotation of the rotating body 300.

The first-third guide groove 423 and the second-third guide groove 323 are disposed to face each other, and the second rolling member RB2 is disposed in a space between the first-third guide groove 423 and the second-third guide groove 323.

A bottom surface of the first-third guide groove 423 and a bottom surface of the second-third guide groove 323 face each other in the optical axis (Z-axis) direction, and a side surface of the first-third guide groove 423 and a side surface of the second-third guide groove 323 face each other in a direction perpendicular to the optical axis (Z-axis).

The second rolling member RB2 is in contact with the first-third guide groove 423 and the second-third guide groove 323. The number of contact points between the second rolling member RB2, and the first-third guide groove 423 and the second-third guide groove 323 is two or three.

For example, when the number of contact points between the second rolling member RB2, and the first-third guide groove 423 and the second-third guide groove 323 is two, the second rolling member RB2 is in contact with the bottom surface of the first-third guide groove 423 and the bottom surface of the second-third guide groove 323.

When the number of contact points between the second rolling member RB2, and the first-third guide groove 423 and the second-third guide groove 323 is three, the second rolling member RB2 is in contact with the bottom surface of the first-third guide groove 423 and the bottom surface of the second-third guide groove 323, and is in contact with one of the side surface of the first-third guide groove 423 and the side surface of the second-third guide groove 323.

A distance between surfaces of the first-third guide groove 423 and the second-third guide groove 323 (e.g., the side surface of the first-third guide groove 423 and the side surface of the second-third guide groove 323) facing each other in the direction perpendicular to the optical axis (Z-axis) direction, is greater than a diameter of the second rolling member RB2.

The second rolling member RB2, the first-third guide groove 423, and the second-third guide groove 323 may function as an auxiliary guide for supporting the rotation of the rotating body 300.

When viewed in the optical axis (Z-axis) direction, the rotating body 300 may be supported at three points with respect to the base 400 by the first rolling member RB1 and the second rolling member RB2 (e.g., a triangular support region).

The first-fourth guide groove 424 and the second-fourth guide groove 324 are disposed to face each other, and the third rolling member RB3 is disposed in a space between the first-fourth guide groove 424 and the second-fourth guide groove 324.

A bottom surface of the first-fourth guide groove 424 and a bottom surface of the second-fourth guide groove 324 face each other in the optical axis (Z-axis) direction, and a side surface of the first-fourth guide groove 424 and a side surface of the second-fourth guide groove 324 face each other in a direction perpendicular to the optical axis (Z-axis).

The third rolling member RB3 is in contact with at least one of the first-fourth guide groove 424 and the second-fourth guide groove 324. The number of contact points between the third rolling member RB3, and the first-fourth guide groove 424 and the second-fourth guide groove 324 is one or two.

For example, when the number of contact points between the third rolling member RB3, and the first-fourth guide groove 424 and the second-fourth guide groove 324 is one, the third rolling member RB3 is in contact with the bottom surface of the first-fourth guide groove 424 or the bottom surface of the second-fourth guide groove 324.

When the number of contact points between the third rolling member RB3, and the first-fourth guide groove 424 and the second-fourth guide groove 324 is two, the third rolling member RB3 is in one-point contact with one of the bottom surface of the first-fourth guide groove 424 and the bottom surface of the second-fourth guide groove 324, and is in one-point contact with one of the side surface of the first-fourth guide groove 424 and the side surface of the second-fourth guide groove 324.

In an example embodiment, a distance in the optical axis (Z-axis) direction between the bottom surface of the first-fourth guide groove 424 and the bottom surface of the second-fourth guide groove 324 may be greater than a distance in the optical axis (Z-axis) direction between the bottom surface of the first-first guide groove 421 and the bottom surface of the second-first guide groove 321.

In an example embodiment, a distance in the optical axis (Z-axis) direction between the bottom surface of the first-fourth guide groove 424 and the bottom surface of the second-fourth guide groove 324 may be greater than a diameter of the rolling ball of the third rolling member RB3.

In an example embodiment, the diameter of the rolling ball of the third rolling member RB3 may be smaller than a diameter of the rolling balls of the first rolling member RB1 and the diameter of the rolling balls of the second rolling member RB2.

The third rolling member RB3 may function to prevent the rotating body 300 from being tilted with respect to the base 400 during external impacts. That is, by preventing the rotating body 300 from being tilted with respect to the base 400 during the external impacts, it may be possible to prevent the rolling portion RB from being separated from the base 400 and the rotating body 300.

However, the third rolling member RB3 is an optional component, and when the third rolling member RB3 is omitted, the rotating body 300 may be prevented from being tilted by adjusting positions of the first rolling member RB1 and the second rolling member RB2.

When viewed in the optical axis (Z-axis) direction, the rotating body 300 may be supported at three points with respect the base 400 by the first rolling member RB1 and the second rolling member RB2.

In this case, in order to stably rotate the rotating body 300, it may be necessary for a center point CP of the attractive force acting between the magnet portion 510 and the pulling yoke portion 550 to be disposed in a support region for connecting a contact point between the first rolling member RB1 and the base 400 (or the rotating body 300) and a contact point between the second rolling member RB2 and the base 400 (or the rotating body 300).

Furthermore, the support region may be wider as it moves closer to the first rolling member RB1, and accordingly, it may be necessary to dispose the central point CP of the attractive force to be close to the first rolling member RB1.

To this end, as the sizes of the first pulling yoke 551 and the second pulling yoke 552 are configured to be made different, the center point CP of the attractive force may be disposed closer to the first rolling member RB1.

In an example embodiment, an area of the first pulling yoke 551 facing the first aperture magnet 511 is larger than an area of the second pulling yoke 552 facing the second aperture magnet 512.

That is, as the size of the first pulling yoke 551 is configured to be larger than the size of the second pulling yoke 552, the center point CP of the attractive force may be disposed closer to the first rolling member RB1.

As another example, as a size of the first aperture magnet 511 is configured to be larger than a size of the second aperture magnet 512, the center point CP of the attractive force is disposed closer to the first rolling member RB1.

As another example, when an optical axis (Z-axis) directional gap between the first aperture magnet 511 and the first pulling yoke 551 is configured to be narrower than an optical axis (Z-axis) directional gap between the second aperture magnet 512 and the second pulling yoke 552, the center point CP of the attractive force may also be closer to the first rolling member RB1.

An area of a portion of the first pulling yoke 551 may be larger than that of the other portion. For example, the first pulling yoke 551 may have a rectangular shape and may have a protrusion protruding from a rectangular long side. Accordingly, a relative position of the first aperture magnet 511 with respect to the first pulling yoke 551 may always be kept constant in a state in which the power is not applied to the aperture driver 500.

In an example embodiment, the first pulling yoke 551 may have an asymmetric shape with respect to the center of the first pulling yoke 551. For example, based on a virtual line passing through the optical axis (the Z-axis) and crossing the center of the first pulling yoke 551, an area of one side of the first pulling yoke 551 may be larger than the area of the other side of the first pulling yoke 551.

As another example, the first pulling yoke 551 may be configured to increase in width as it moves from one end in a longitudinal direction to the other end in the longitudinal direction.

As another example, the first pulling yoke 551 may be provided as two yokes disposed adjacently to each other. In this case, a size of one yoke may be larger than a size of the other yoke.

Referring to FIG. 8, the aperture module 2 according to an example embodiment of the present disclosure may further include an auxiliary yoke 560.

The auxiliary yoke 560 may be disposed closer to the first aperture magnet 511 than the second aperture magnet 512.

The first aperture magnet 511, the first pulling yoke 551, and the auxiliary yoke 560 may be disposed in a space between the first rolling ball RB1a and the second rolling ball RB1b, when viewed in the optical axis (Z-axis) direction.

The auxiliary yoke 560 may be disposed on an internal surface extending in the optical axis (Z-axis) direction among the surfaces of the base 400. For example, the auxiliary yoke 560 may be disposed so that at least a portion of the auxiliary yoke 560 faces the first aperture magnet 511 in a direction perpendicular to the optical axis (the Z-axis). The auxiliary yoke 560 may be a magnetic material.

The auxiliary yoke 560 may be integrally coupled to the base 400 by insert injection. In this case, the auxiliary yoke 560 may be manufactured so that the auxiliary yoke 560 is integrated into the base 400 by injecting resin into a mold in a state in which the auxiliary yoke 560 is fixed in the mold.

In an example embodiment, a position of an upper end of the auxiliary yoke 560 in the optical axis (Z-axis) direction may be between an upper surface and a lower surface of the first aperture magnet 511.

The attractive force is applied in the optical axis (Z-axis) direction by the first aperture magnet 511 and the first pulling yoke 551, and the attractive force is applied in a direction (e.g., a direction perpendicular to the optical axis (Z-axis), or a direction inclined downwardly while crossing the optical axis (Z-axis)) crossing the optical axis (Z-axis) by the first aperture magnet 511 and the auxiliary yoke 560. That is, the attractive force may act on the first aperture magnet 511 in at least two directions crossing each other.

By the attractive force acting between the first aperture magnet 511 and the first pulling yoke 551, the rotating body 300 equipped with the first aperture magnet 511 is pulled in the optical axis (Z-axis) direction toward the base 400 equipped with the first pulling yoke 551.

Accordingly, due to the attractive force acting between the first aperture magnet 511 and the first pulling yoke 551, the first rolling ball RB1a is in contact with a bottom surface of the first-first guide groove 421 and a bottom surface of the second-first guide groove 321.

Furthermore, by the attractive force acting between the first aperture magnet 511 and the first pulling yoke 551, the second rolling ball RB1b is in contact with a bottom surface of the first-second guide groove 422 and a bottom surface of the second-second guide groove 322.

By the force acting between the first aperture magnet 511 and the auxiliary yoke 560, the rotating body 300 equipped with the first aperture magnet 511 is pulled in a direction crossing the optical axis (Z-axis) toward the base 400 equipped with the auxiliary yoke 560.

Accordingly, by the attractive force acting between the first aperture magnet 511 and the auxiliary yoke 560, the first rolling ball RB1a is in contact with a side surface of the first-first guide groove 421 and a side surface of the second-first guide groove 321.

Furthermore, by the attractive force acting between the first aperture magnet 511 and the auxiliary yoke 560, the second rolling ball RB1b is in contact with a side surface of the first-second guide groove 422 and a side surface of the second-second guide groove 322.

A side surface of the first-first guide groove 421, a side surface of the first-second guide groove 422, a side surface of the second-first guide groove 321, and a side surface of the second-second guide groove 322 may be curved surfaces, respectively.

For example, a curvature radius of the side surface of the first-first guide groove 421 and a curvature radius of the side surface of the first-second guide groove 422 may be identical to each other. Furthermore, a curvature radius of the side surface of the second-first guide groove 321 and a curvature radius of the side surface of the second-second guide groove 322 may be identical to each other.

Furthermore, a virtual circle passing through the side surface of the first-first guide groove 421 and the side surface of the first-second guide groove 422 and a virtual circle passing through the side surface of the second-first guide groove 321 and the side surface of the second-second guide groove 322 may be concentric circles.

The auxiliary yoke 560 may be disposed outside in a direction perpendicular to the optical axis (Z-axis), relative to a virtual circle passing through the side surface of the first-first guide groove 421 and the side surface of the first-second guide groove 422. Furthermore, the auxiliary yoke 560 may be disposed outside in a direction perpendicular to the optical axis (Z-axis), relative to a virtual circle passing through the side surface of the second-first guide groove 321 and the side surface of the second-second guide groove 322.

When driving force is generated by the aperture driver 500, the first rolling ball RB1a rolls along the side surface of the first-first guide groove 421 and the side surface of the second-first guide groove 321, and the second rolling ball RB1b rolls along the side surface of the first-second guide groove 422 and the side surface of the second-second guide groove 322.

Accordingly, the rotating body 300 may be guided by the first rolling ball RB1a and the second rolling ball RB1b and then rotated.

When the rotating body 300 rotates, the second rolling member RB2 maintains contact with a bottom surface of the first-third guide groove 423 and a bottom surface of the second-third guide groove 323, and the rotating body 300 may maintain a three-point support form with respect to the rolling portion RB.

In an example embodiment, the aperture module 2 may sense the position of the rotating body 300.

To this end, an aperture position sensor 530 is provided. The aperture position sensor 530 is disposed on the aperture substrate 540 to face the magnet portion 510. For example, the aperture position sensor 530 may face at least one of the first aperture magnet 511 and the second aperture magnet 512 in the optical axis (Z-axis) direction.

The aperture position sensor 530 may be a hall sensor.

Figure 12:
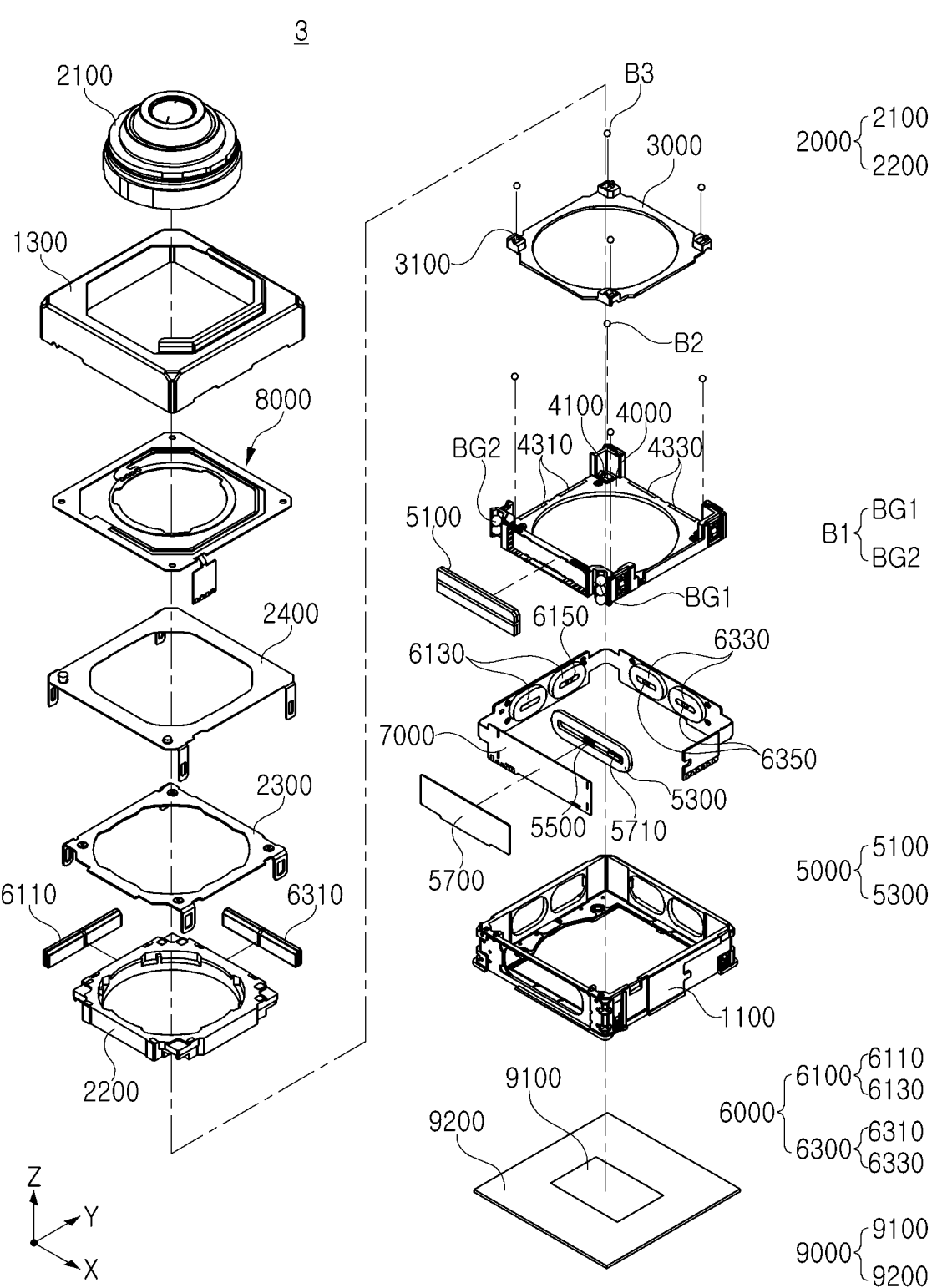
FIG. 12 is an exploded perspective view of a camera actuator according to an example embodiment.
Figure 13:
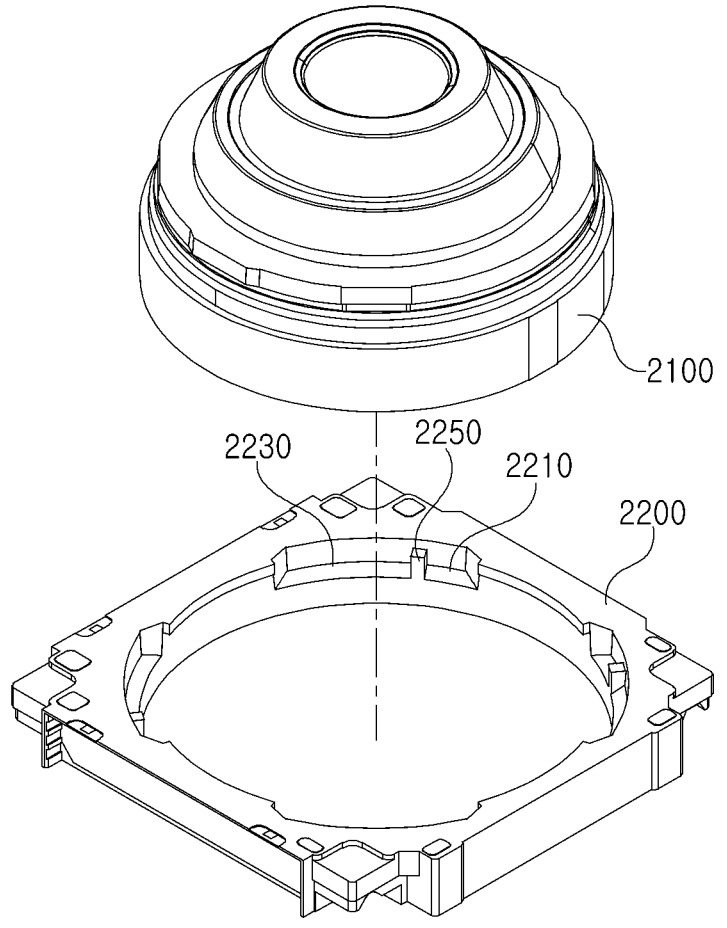
FIG. 13 is an exploded perspective view of a lens barrel and a lens holder.
Figure 14:
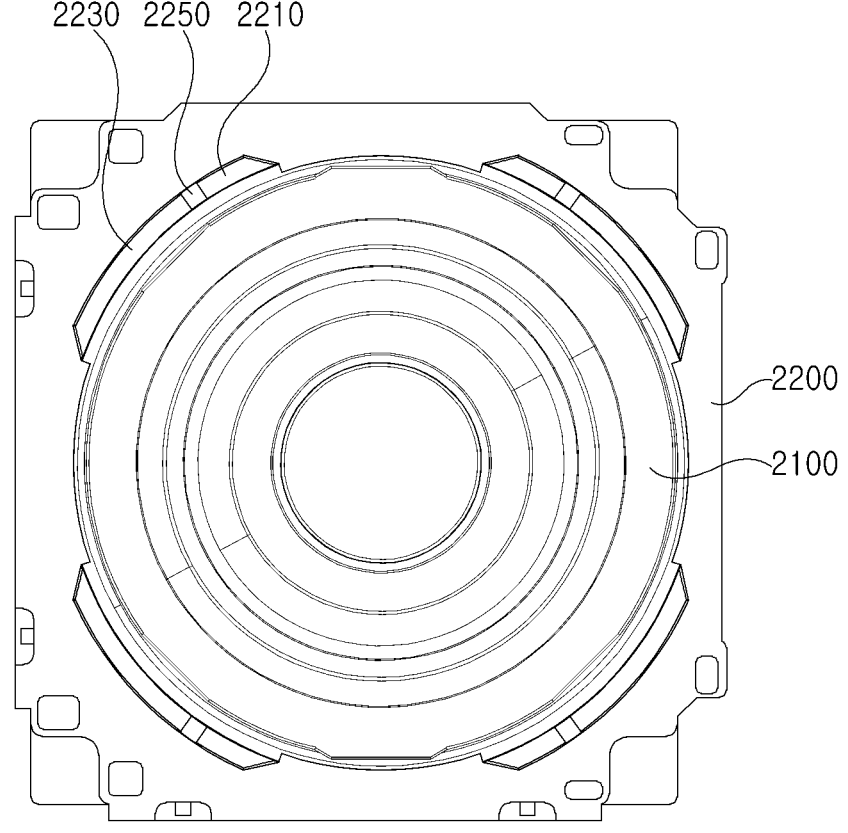
FIG. 14 is a plan view illustrating a state in which a lens barrel and a lens holder are coupled to each other.

FIG. 12 is an exploded perspective view of a camera actuator according to an example embodiment, FIG. 13 is an exploded perspective view of a lens barrel and a lens holder, and FIG. 14 is a plan view illustrating a state in which a lens barrel and a lens holder are coupled to each other.

Figure 15:
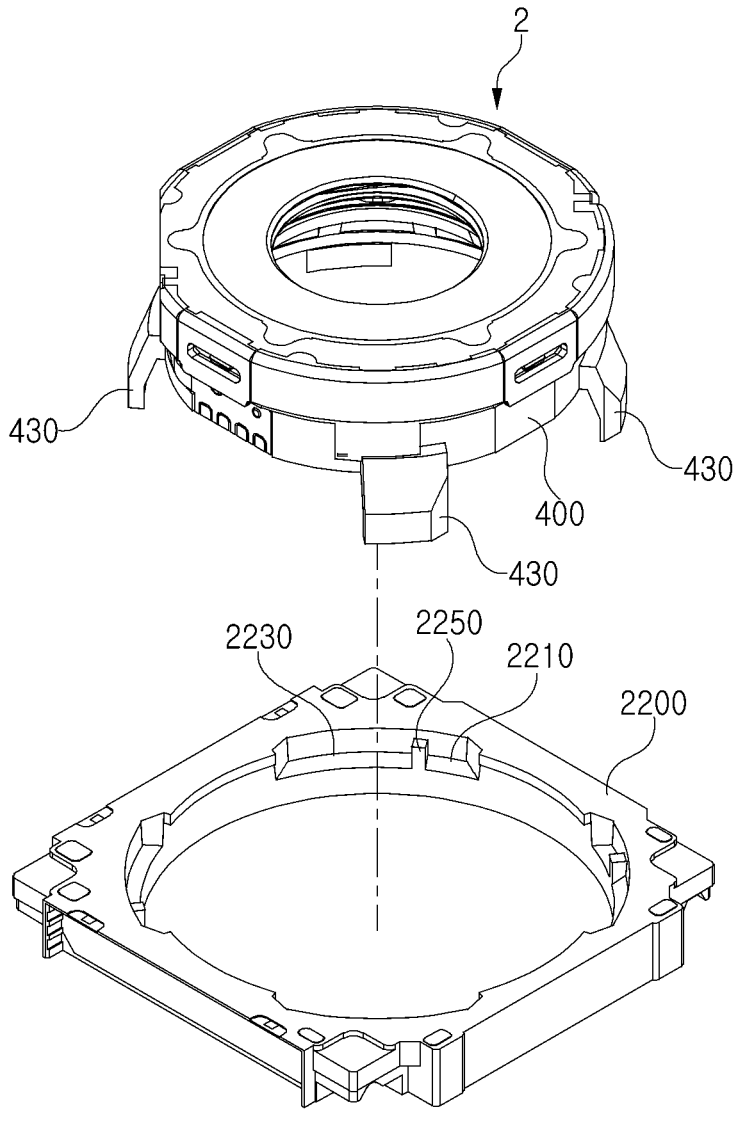
FIG. 15 is an exploded perspective view of an aperture module and a lens holder.

Furthermore, FIG. 15 is an exploded perspective view of the aperture module and the lens holder.

Referring to FIG. 12, a camera actuator 3 according to an example embodiment of the present disclosure includes a lens module 2000 and a housing 1100 configured to accommodate the lens module 2000.

Furthermore, the camera actuator 3 may further include a guide frame 3000, a carrier 4000, a case 1300, and an image sensor module 9000.

In the following embodiment, an example in which the base 400 of the aperture module 2 is coupled to the lens module 2000 of the camera actuator 3 will be described. In this case, the aperture module 2 may move, along with the lens module 2000, as the lens module 2000 is moved.

The carrier 4000 is disposed in the housing 1100 and may be moved relative to the housing 1100 in the optical axis (Z-axis) direction.

The lens module 2000 is disposed in the carrier 4000, and the carrier 4000 and the lens module 2000 may move together in the optical axis (Z-axis) direction. Accordingly, a distance between the lens module 2000 and an image sensor 9100 may be changed to adjust the focus.

Furthermore, the guide frame 3000 may be disposed between the carrier 4000 and the lens module 2000. The guide frame 3000 may function to guide the lens module 2000 to be moved in a direction perpendicular to the optical axis (Z-axis) direction.

The lens module 2000 may be moved in a direction perpendicular to the optical axis (Z-axis) direction, to correct shaking during capturing.

The lens module 2000 may include a lens barrel 2100 and a lens holder 2200. The lens barrel 2100 may have a hollow cylindrical shape, and at least one lens for capturing an image of a subject may be accommodated in the lens barrel 2100. When a plurality of lenses are disposed, the plurality of lenses are mounted in the lens barrel 2100 in an optical axis (Z-axis).

The lens barrel 2100 is coupled to the lens holder 2200. Accordingly, the lens barrel 2100 and the lens holder 2200 may be moved together.

In an example embodiment, the lens barrel 2100 may be coupled to the lens holder 2200 such that an external surface thereof is in contact with an internal surface of the lens holder 2200.

Referring to FIGS. 13 and 14, the lens holder 2200 may have a first bonding groove 2210 formed in the internal surface thereof. An adhesive may be applied to the first bonding groove 2210, and thus the lens barrel 2100 may be firmly coupled to the lens holder 2200. A plurality of first bonding grooves 2210 may be formed to be spaced apart from each other on the internal surface of the lens holder 2200.

Referring to FIG. 15, the aperture module 2 may be coupled to the lens holder 2200. For example, the base 400 of the aperture module 2 may be coupled to the lens holder 2200.

The lens barrel 2100 is also coupled to the lens holder 2200, and for convenience of explanation, the lens barrel 2100 is not illustrated in FIG. 15.

In an example embodiment, the base 400 of the aperture module 2 includes a support protrusion 430 protruding in the optical axis (Z-axis) direction toward the lens holder 2200. Furthermore, the lens holder 2200 may have a second bonding groove 2230 formed in an internal surface thereof.

At least a portion of the support protrusion 430 of the base 400 may be disposed in the second bonding groove 2230 of the lens holder 2200. In a state in which the support protrusion 430 is disposed in the second bonding groove 2230, the support protrusion 430 may be disposed to be spaced apart from the internal surface of the second bonding groove 2230 and the external surface of the lens barrel 2100. For example, a thickness of the support protrusion 430 may be smaller than a distance between the external surface of the lens barrel 2100 and the internal surface of the second bonding groove 2230.

Furthermore, the support protrusion 430 may be disposed so that a lower surface thereof is spaced apart from a bottom surface of the second bonding groove 2230.

An adhesive may be applied to the second bonding groove 2230. The adhesive may surround the support protrusion 430. For example, the adhesive applied to the second bonding groove 2230 may be in contact with all of the second bonding groove 2230, the support protrusion 430, and the external surface of the lens barrel 2100.

Accordingly, the lens barrel 2100 and the lens holder 2200 may be more firmly coupled, and the aperture module 2 and the lens holder 2200 may also be firmly coupled.

A plurality of second bonding grooves 2230 may be formed to be spaced apart from each other on the internal surface of the lens holder 2200.

A partition wall 2250 may be disposed between the first bonding groove 2210 and the second bonding groove 2230. This is to prevent the adhesive from flowing to the second bonding groove 2230 when the lens barrel 2210 is coupled to the lens holder 2200.

Meanwhile, the aperture module 2 may also be coupled to the lens barrel 2100. For example, a bottom surface of the base 400 of the aperture module 2 may be bonded to a top surface of the lens barrel 2100. A portion in which the aperture module 2 and the lens barrel 2100 are bonded may be continuously formed in a circumferential direction of the lens barrel 2100.

In a structure in which the aperture module 2 moves together with the lens module 2000, the aperture module 2 must be coupled to the lens module 2000. In this case, when a load of the aperture module 2 is concentrated in a specific region of the lens module 2000, the aperture module 2 and the lens module 2000 may be separated by impacts.

Accordingly, the aperture module 2 may be bonded to the lens barrel 2100 and the lens holder 2200 by an adhesive, respectively, to prevent the load of the aperture module 2 from being concentrated on a specific region.

The lens module 2000 is accommodated in the housing 1100. For example, the housing 1100 has a shape in which an upper portion and a lower portion thereof are open, and the carrier 4000 may be disposed in an internal space of the housing 1100, and the lens module 2000 may be accommodated in the carrier 4000.

The camera actuator 3 may adjust a focus by moving the lens module 2000 in the optical axis (Z-axis) direction, and correct the shaking during image capturing by moving the lens module 2000 in a direction perpendicular to the optical axis (Z-axis).

The camera actuator 3 includes a focus driver 5000 configured to move the lens module 2000 in the optical axis (Z-axis) direction, and a shaking driver 6000 configured to move the lens module 2000 in a direction perpendicular to the optical axis (Z-axis) direction.

The image sensor module 9000 is a device converting light incident through the lens module 2000 into an electrical signal.

For example, the image sensor module 9000 may include an image sensor 9100 and a printed circuit board 9200 connected to the image sensor 9100, and may further include an infrared filter.

The infrared filter serves to block light in an infrared region among light incident through the lens module 2000.

The image sensor 9100 converts light incident through the lens module 2000 into an electrical signal. For example, the image sensor 9100 may be a charge coupled device (CCD) or a complementary metal-oxide semiconductor (CMOS).

The electrical signal converted by the image sensor 9100 is output as an image through a display unit of a portable electronic device.

The image sensor 9100 is fixed to the printed circuit board 9200 and is electrically connected to the printed circuit board 9200 by wire bonding.

The image sensor module 9000 is disposed below the housing 1100.

The case 1300 is coupled to the housing 1100 to surround an external surface of the housing 1100 and serves to protect internal components of the camera actuator 3.

The focus driver 5000 may move the lens module 2000 to focus on the subject. For example, the focus driver 5000 may generate driving force in the optical axis (the Z-axis) direction to move the carrier 4000. Since the lens module 2000 is disposed in the carrier 4000, the carrier 4000 and the lens module 2000 may be moved together in the optical axis (Z-axis) direction by the driving force of the focus driver 5000.

Furthermore, since the base 400 of the aperture module 2 is coupled to the lens module 2000, the aperture module 2 may also be moved in the optical axis (Z-axis) direction, along with the lens module 2000.

The focus driver 5000 includes a first magnet 5100 and a first coil 5300. The first magnet 5100 and the first coil 5300 may be disposed to face each other in a direction perpendicular to the optical axis (the Z-axis).

The first magnet 5100 is mounted in the carrier 4000. For example, the first magnet 5100 may be mounted on one side surface of the carrier 4000.

The first magnet 5100 may be magnetized so that one surface thereof (e.g., a surface facing the first coil 5300) has both an N-pole and an S-pole. For example, one surface of the first magnet 5100 facing the first coil 5300 may be provided with an N-pole, a neutral region, and an S-pole sequentially in the optical axis (Z-axis) direction.

The first coil 5300 is disposed to face the first magnet 5100. For example, the first coil 5300 may be disposed to face the first magnet 5100 in the direction perpendicular to the optical axis (the Z-axis).

The first coil 5300 is disposed on the substrate 7000, and the substrate is mounted in the housing 1100 such that the first magnet 5100 and the first coil 5300 face each other in a direction perpendicular to the optical axis (Z-axis). For example, the first coil 5300 may be disposed on one surface of the substrate 7000. The substrate 7000 is mounted on a side surface of the housing 1100 so that the first magnet 5100 and the first coil 5300 face each other in a direction perpendicular to the optical axis (the Z-axis).

The housing 1100 has an opening, and the first coil 5300 disposed on the substrate 7000 may directly face the first magnet 5100 through the opening.

The first magnet 5100 is a moving member mounted in the carrier 4000 and moving in the optical axis (Z-axis) direction, along with the carrier 4000, and the first coil 5300 is a fixing member fixed to the substrate 7000.

When power is applied to the first coil 5300, the carrier 4000 may be moved in the optical axis (Z-axis) direction by the electromagnetic force between the first magnet 5100 and the first coil 5300.

Since the lens module 2000 is accommodated in the carrier 4000, the lens module 2000 is also moved in the optical axis (Z-axis) direction by the movement of the carrier 4000. Furthermore, the aperture module 2 is also moved in the optical axis (Z-axis) direction, along with the lens module 2000.

A first ball member 1 may be disposed between the carrier 4000 and the housing 1100. For example, the first ball member 1 may be disposed between the carrier 4000 and the housing 1100 to reduce friction when the carrier 4000 is moved.

The first ball member 1 includes a plurality of balls disposed in the optical axis (the Z-axis) direction. The plurality of balls may roll in the optical axis (Z-axis) direction when the carrier 4000 is moved in the optical axis (Z-axis) direction.

A first yoke 5700 is disposed in the housing 1100. The first yoke 5700 may be disposed in a position facing the first magnet 5100. For example, the first coil 5300 may be disposed on one surface of the substrate 7000, and the first yoke 5700 may be disposed on the other surface of the substrate 7000.

The first magnet 5100 and the first yoke 5700 may generate attractive force therebetween. For example, the first yoke 5700 may be formed of a magnetic material. Attractive force acts between the first magnet 5100 and the first yoke 5700 in a direction perpendicular to the optical axis (Z-axis).

The first ball member 1 may be in contact with the carrier 4000 and the housing 1100, respectively, due to the attractive force of the first magnet 5100 and the first yoke 5700.

An accommodating groove may be disposed on a surface on which the carrier 4000 and the housing 1100 face each other. For example, the carrier 4000 may be provided with a first accommodating groove, and the housing 1100 may be provided with a second accommodating groove.

Each of the first accommodating groove and the second accommodating groove extends in the optical axis (Z-axis) direction. The first ball member 1 is disposed between the first accommodating groove and the second accommodating groove.

The first ball member 1 includes a first ball group BG1 and a second ball group BG2, and each of the first ball group BG1 and the second ball group BG2 includes a plurality of balls disposed in the optical axis (Z-axis) direction.

The first ball group BG1 and the second ball group BG2 are spaced apart in a direction perpendicular to the optical axis (Z-axis) (e.g., an X-axis direction). The number of balls in the first ball group BG1 and the number of balls in the second ball group BG2 may be different from each other.

For example, the first ball group BG1 includes two or more balls disposed in the optical axis (Z-axis) direction, and the second ball group BG2 includes a fewer number of balls than the number of balls included in the first ball group BG1.

In the case that the number of balls in the first ball group BG1 and the number of balls in the second ball group BG2 are different from each other, the number of balls in each ball member may be changed. Hereinafter, for convenience of explanation, the description will be based on an example embodiment in which the first ball group BG1 includes three balls and the second ball group BG2 includes two balls.

Among the three balls included in the first ball group BG1, the two balls disposed on outermost sides in a direction parallel to the optical axis (Z-axis), have the same diameter, and one ball disposed therebetween has a smaller diameter than the balls disposed on the outermost sides.

The two balls included in the second ball group BG2 may have the same diameter.

Meanwhile, in an example embodiment, an auxiliary yoke 5710 may be disposed in a position facing the first magnet 5100. For example, the auxiliary yoke 5710 may be disposed on the substrate 7000 to face the first magnet 5100. Furthermore, the auxiliary yoke 5710 may be disposed inside the first coil 5300.

The auxiliary yoke 5710 may be disposed closer to the first ball group BG1 than the second ball group BG2. The auxiliary yoke 5710 is a material that may generate the attractive force with respect to the first magnet 5100.

Accordingly, the sum of the attraction force acting between the first magnet 5100 and the first yoke 5700 and the attraction force acting between the first magnet 5100 and the auxiliary yoke 5710 may be disposed closer to the first ball group BG1 than the second ball group BG2.

In an example embodiment, a camera actuator 3 may sense a position of the carrier 4000 in the optical axis (Z-axis) direction.

For this purpose, a first position sensor 5500 is provided. The first position sensor 5500 is disposed on the substrate 7000 to face the first magnet 5100. The first position sensor 5500 may be a Hall sensor.

The camera actuator 3 may correct shaking during capturing by moving the lens module 2000 in the direction perpendicular to the optical axis (Z-axis). To this end, the camera actuator 3 includes a shake driver 6000 configured to move the lens module 2000 in the direction perpendicular to the optical axis (Z-axis).

The guide frame 3000 and the lens module 2000 may be sequentially accommodated in the carrier 4000. For example, a guide frame 3000 may be disposed between the carrier 4000 and the lens module 2000. The guide frame 3000 may have a square plate shape having a hollow.

The guide frame 3000 and the lens module 2000 may be moved together in a direction perpendicular to the optical axis (Z-axis), by the driving force of the shaking driver 6000, and the lens module 2000 may be moved relative to the guide frame 3000 in the other direction perpendicular to the optical axis (Z-axis).

For example, the guide frame 3000 and the lens module 2000 may be moved together in a first axis (X-axis) direction, perpendicular to the optical axis (Z-axis), and the lens module 2000 may be moved relative to the guide frame 3000 in a second axis (Y-axis) direction, perpendicular to both the optical axis (Z-axis) and the first axis (X-axis).

Furthermore, since the base 400 of the aperture module 2 is coupled to the lens module 2000, the aperture module 2 may also be moved in the first axis (X-axis) direction and the second axis (Y-axis) direction, along with the lens module 2000.

The shaking driver 6000 includes a first sub-driver 6100 and a second sub-driver 6300. The first sub-driver 6100 may generate driving force in the first axis (X-axis) direction, and the second sub-driver 6300 may generate driving force in the second axis (Y-axis) direction.

The first sub-driver 6100 includes a second magnet 6110 and a second coil 6130. The second magnet 6110 and the second coil 6130 may be disposed to face each other in the first axis (X-axis) direction.

The second magnet 6110 may be disposed in the lens module 2000. For example, the second magnet 6110 may be mounted on one side surface of the lens holder 2200.

The second magnet 6110 may be magnetized so that one surface has both an N-pole and an S-pole. For example, one surface of the second magnet 6110 may be provided with an N-pole, a neutral region, and an S-pole sequentially in the second axis (Y-axis) direction. The second magnet 6110 has a shape having a length in the second axis (Y-axis) direction.

The other surface of the second magnet 6110 may be magnetized to have a polarity opposite to that of the one surface of the second magnet 6110.

The second coil 6130 is disposed to face the second magnet 6110. For example, the second coil 6130 may be disposed to face the second magnet 6110 in the first axis (X-axis) direction.

The second coil 6130 may include two coils, and each of the two coils of the second coil 6130 may have a donut shape having a hollow.

One of the two coils of the second coil 6130 may be disposed to face the N-pole of one surface of the second magnet 6110, and the other one of the two coils of the second coil 6130 may be disposed to face the S-pole of one surface of the second magnet 6110.

Due to a polarity arrangement of the second magnet 6110, magnetic field leakage may be prevented, and thus sufficient driving force may be generated even at low power.

During correction of the shaking, the second magnet 6110 is a moving member mounted in the lens module 2000, and the second coil 6130 is a fixed member fixed to the housing 1100.

When power is applied to the second coil 6130, the lens module 2000 and the guide frame 3000 may be moved in the first axis (X-axis) direction by the electromagnetic force between the second magnet 6110 and the second coil 6130.

The second magnet 6110 and the second coil 6130 may generate driving force in a direction in which the second magnet 6110 and the second coil 6130 face each other (e.g., in the first axis (X-axis) direction).

The second sub-driver 6300 includes a third magnet 6310 and a third coil 6330. The third magnet 6310 and the third coil 6330 may be disposed to face each other in the second axis (Y-axis) direction.

The third magnet 6310 may be disposed on the lens module 2000. For example, the third magnet 6310 may be mounted on another side surface of the lens holder 2200.

The third magnet 6310 may be magnetized so that one surface thereof has both an S-pole and an N-pole. For example, one surface of the third magnet 6310 may be provided with an S-pole, a neutral region, and an N-pole sequentially in the first axis (X axis) direction. The third magnet 6310 has a shape having a length in the first axis (X-axis) direction.

The other surface of the third magnet 6310 may be magnetized to have a polarity opposite to that of the one surface of the third magnet 6310.

The third coil 6330 is disposed to face the third magnet 6310. For example, the third coil 6330 may be disposed to face the third magnet 6310 in the second axis (Y-axis) direction.

The third coil 6330 may include two coils, and each of the two coils of the third coil 6330 may have a donut shape with a hollow.

One of the two coils of the third coil 6330 may be disposed to face the N-pole of one surface of the third magnet 6310, and the other one of the two coils of the third coil 6330 may be disposed to face the S-pole of one surface of the third magnet 6310.

Due to the polarity arrangement of the third magnet 6310, magnetic field leakage may be prevented, and thus sufficient driving force may be generated even at low power.

The second coil 6130 and the third coil 6330 may be provided on the substrate 7000. For example, the second coil 6130 and the third coil 6330 may be disposed on the substrate 7000 to face the second magnet 6110 and the third magnet 6310.

The substrate 7000 is mounted on a side surface of the housing 1100, and the second coil 6130 and the third coil 6330 may directly face the second magnet 6110 and the third magnet 6310 through an opening provided in the housing 1100.

During the correction of the shaking, the third magnet 6310 is a moving member mounted on the lens module 2000, and the third coil 6330 is a fixed member fixed to the housing 1100.

When power is applied to the third coil 6330, the lens module 2000 may be moved in the second axis (Y-axis) direction by the electromagnetic force between the third magnet 6310 and the third coil 6330.

The third magnet 6310 and the third coil 6330 may generate driving force in a direction in which the third magnet 6310 and the third coil 6330 face each other (e.g., the second axis (Y-axis) direction).

The second magnet 6110 and the third magnet 6310 are disposed perpendicular to each other in a plane perpendicular to the optical axis (Z-axis), and the second coil 6130 and the third coil 6330 are also disposed perpendicular to each other on the plane perpendicular to the optical axis (Z-axis).

The camera actuator 3 according to an example embodiment of the present disclosure is provided with a plurality of ball members supporting the guide frame 3000 and the lens module 2000. The plurality of ball members function to guide the movement of the guide frame 3000 and the lens module 2000 during a shaking correction process. Furthermore, the plurality of ball members function to maintain a gap between the carrier 4000, the guide frame 3000, and the lens module 2000.

The plurality of ball members includes a second ball member B2 and a third ball member B3.

The second ball member B2 guides the movement of the guide frame 3000 and the lens module 2000 in the first axis (X axis) direction, and the third ball member B3 guides the movement of the lens module 2000 in the second axis (Y axis) direction.

As an example, the second ball member B2 rolls in the first axis (X-axis) direction when driving force in the first axis (X-axis) direction is generated. Accordingly, the second ball member B2 guides the movement of the guide frame 3000 and the lens module 2000 in the first axis (X-axis) direction.

The third ball member B3 rolls in the second axis (Y-axis) direction when driving force is generated in the second axis (Y-axis) direction. Accordingly, the third ball member B3 guides the movement of the lens module 2000 in the second axis (Y-axis) direction.

The second ball member B2 includes a plurality of ball members disposed between the carrier 4000 and the guide frame 3000, and the third ball member B3 includes a plurality of ball members disposed between the guide frame 3000 and the lens module 2000.

For example, each of the second ball member B2 and the third ball member B3 may include four ball members.

A third accommodating groove 4100 configured to accommodate the second ball member B2 is formed on at least one of surfaces on which the carrier 4000 and the guide frame 3000 face each other in the optical axis (Z-axis) direction. The third accommodating groove 4100 includes a plurality of grooves corresponding to the plurality of ball members of the second ball member B2.

The second ball member B2 is accommodated in the third accommodating groove 4100 and is inserted between the carrier 4000 and the guide frame 3000.

In a state in which the second ball member B2 is accommodated in the third accommodating groove 4100, a movement of the second ball member B2 in the optical axis (Z-axis) direction and the second axis (Y-axis) direction may be limited, and the second ball member B2 may be moved only in the first axis (X-axis) direction. For example, the second ball member B2 may roll only in the first axis (X-axis) direction.

To this end, a planar shape of each of the plurality of grooves of the third accommodating groove 4100 may be a rectangle having a length in the first axis (X-axis) direction.

A fourth accommodating groove 3100 configured to accommodate the third ball member B3 is formed on at least one of surfaces on which the guide frame 3000 and the lens module 2000 (e.g., the lens holder 2200) face each other in the optical axis (Z-axis) direction. The fourth accommodating groove 3100 includes a plurality of grooves corresponding to the plurality of ball members of the third ball member B3.

The third ball member B3 is accommodated in the fourth accommodating groove 3100 and is inserted between the guide frame 3000 and the lens module 2000.

In a state in which the third ball member B3 is accommodated in the fourth accommodating groove 3100, a movement of the third ball member B3 in the optical axis (Z-axis) direction and the first axis (X-axis) direction may be limited, and the third ball member B3 may be moved only in the second axis (Y-axis) direction. For example, the third ball member B3 may roll only in the second axis (Y-axis) direction.

To this end, a planar shape of each of the plurality of grooves of the fourth accommodating groove 3100 may be a rectangle having a length in the second axis (Y-axis) direction.

When driving force is generated in the first axis (X-axis) direction, the guide frame 3000 and the lens module 2000 move together in the first axis (X-axis) direction. Furthermore, the aperture module 2 also moves in the first axis (X-axis) direction, along with the lens module 2000.

Here, the second ball member B2 rolls along the first axis (X-axis). In this case, a movement of the third ball member B3 is limited.

Furthermore, when driving force is generated in the second axis (Y-axis) direction, the lens module 2000 is moved relative to the guide frame 3000 in the second axis (Y-axis) direction. Furthermore, the aperture module 2 also move in the second axis (Y-axis) direction, along with the lens module 2000.

Here, the third ball member B3 rolls along the second axis (Y-axis). In this case, a movement of the second ball member B2 is limited.

In an example embodiment, the camera actuator 3 may sense a position of the lens module 2000 in a direction perpendicular to the optical axis (Z-axis).

For this purpose, a second position sensor 6150 and a third position sensor 6350 are provided. The second position sensor 6150 may be disposed on the substrate 7000 to face the second magnet 6110, and the third position sensor 6350 may be disposed on the substrate 7000 to face the third magnet 6310. The second position sensor 6150 and the third position sensor 6350 may be hall sensors.

At least one of the second position sensor 6150 and the third position sensor 6350 may include two hall sensors. For example, the third position sensor 6350 includes two hall sensors disposed to face the third magnet 6310.

Whether the lens module 2000 is rotated may be sensed through the two hall sensors facing the third magnet 6310. Since the third coil 6330 includes two coils facing the third magnet 6310, rotational force applied to the lens module 2000 may be offset by controlling the third coil 6330.

Although the lens module 2000 may be prevented from rotating due to configurations of the third accommodating groove and the fourth accommodating groove in which the second ball member B2 and the third ball member B3 are disposed, the lens module 2000 may be minutely rotated due to an influence of tolerance generated in a manufacturing process of an instrument.

However, the camera actuator 3 according to an example embodiment of the present disclosure may determine whether the lens module 2000 is rotated by the third coil 6330 and the third position sensor 6350 and may offset the rotational force accordingly.

In the present disclosure, a second yoke 4310 and a third yoke 4330 are provided so that the carrier 4000 and the guide frame 3000 may maintain contact with the second ball member B2, and the guide frame 3000 and the lens module 2000 may maintain contact with the third ball member B3.

The second yoke 4310 and the third yoke 4330 are fixed to the carrier 4000 and are disposed to face the second magnet 6110 and the third magnet 6310 in the optical axis (Z-axis) direction.

Accordingly, the attractive force is generated between the second yoke 4310 and the second magnet 6110, and between the third yoke 4330 and the third magnet 6310, respectively, in the optical axis (Z-axis) direction.

Since the lens module 2000 and the guide frame 3000 are pressed in a direction oriented toward the second yoke 4310 and the third yoke 4330 by the attractive force between the second yoke 4310 and the second magnet 6110, and between the third yoke 4330 and the third magnet 6310, the guide frame 3000 and the lens module 2000 may maintain contact with the second ball member B2 and the third ball member B3.

The second yoke 4310 and the third yoke 4330 are formed of a material that may generate the attractive force with the second magnet 6110 and the third magnet 6310, respectively. As an example, the second yoke 4310 and the third yoke 4330 may be magnetic materials.

A first stopper 2300 is coupled to the carrier 4000. The first stopper 2300 is coupled to the carrier 4000 to cover at least a portion of an upper surface of the lens module 2000.

For example, the first stopper 2300 may cover at least a portion of the upper surface of the lens holder 2200.

The first stopper 2300 may prevent the guide frame 3000 and the lens module 2000 from being separated to the outside of the carrier 4000 due to external impacts or the like.

A buffer member having elastic force may be coupled to a corner portion of the first stopper 2300.

Furthermore, a second stopper 2400 is coupled to the housing 1100. The second stopper 2400 includes a buffering protrusion disposed in a position facing the first ball member 1 in the optical axis (Z-axis) direction.

The second stopper 2400 may prevent the carrier 4000 and the first ball member 1 from being separated to the outside due to external impacts or the like.

Figures 16, 17:
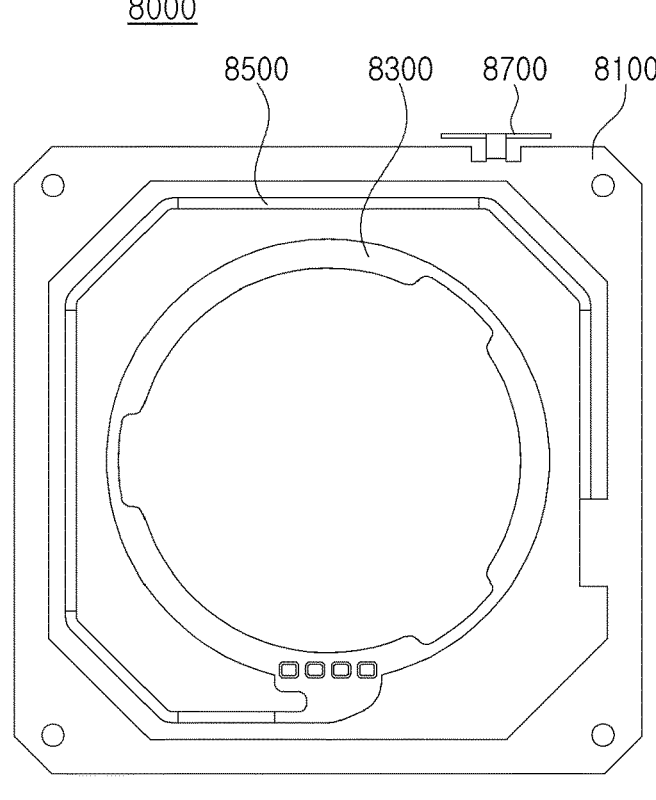
FIG. 16 is a plan view of a connection substrate of a camera actuator.
FIG. 17 is a perspective view of a state in which a connection substrate and a case are coupled.
Figure 18:
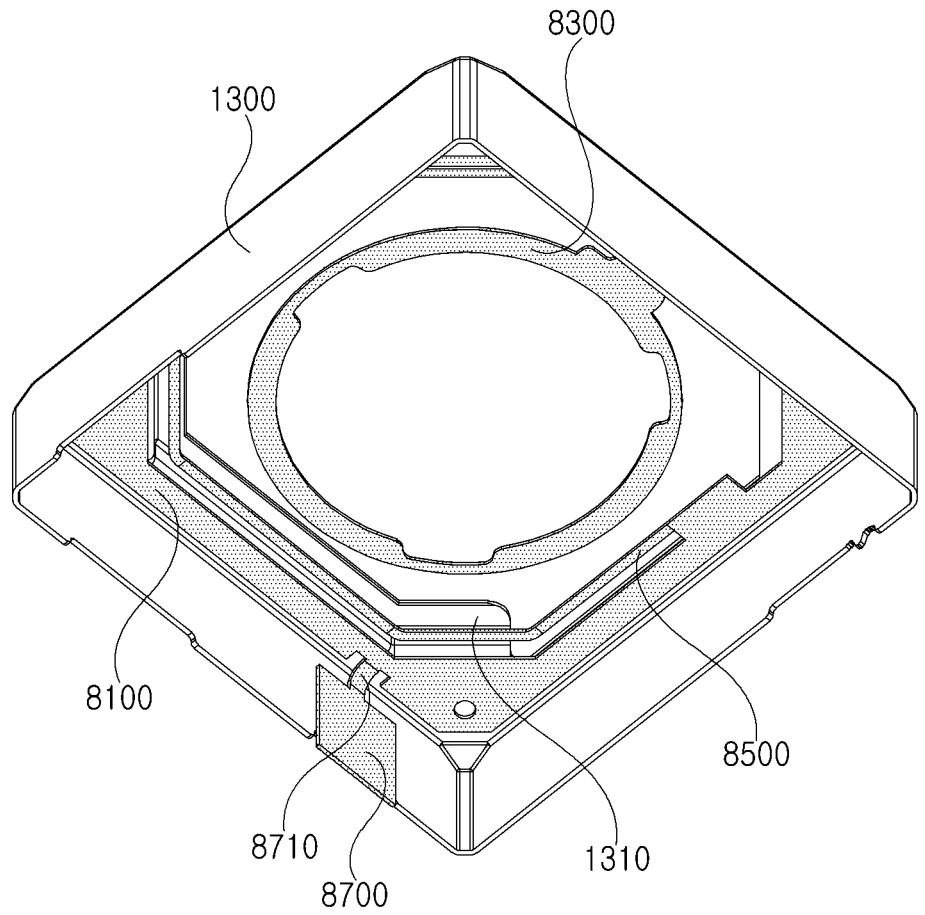
FIG. 18 is a bottom perspective view of FIG. 17.

FIG. 16 is a plan view of a connection substrate of a camera actuator, FIG. 17 is a perspective view of a state in which a connection substrate and a case are coupled, and FIG. 18 is a bottom perspective view of FIG. 17.

Figure 19:
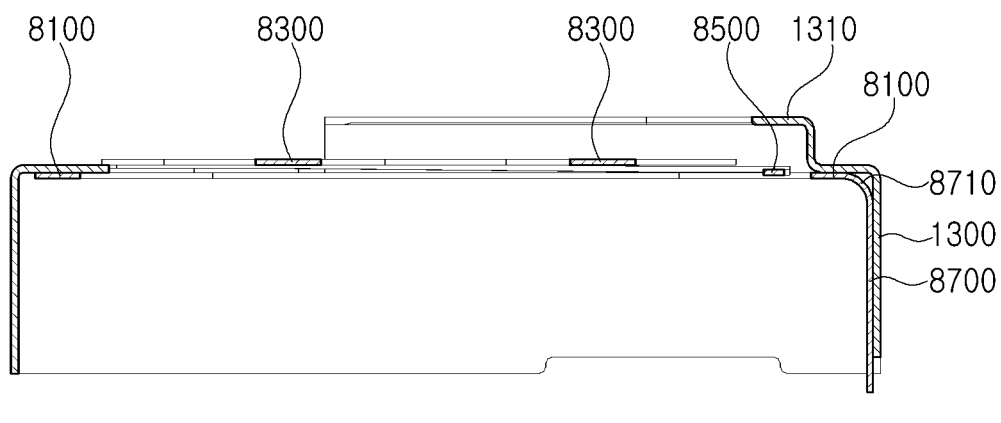
FIG. 19 is a cross-sectional view taken along line II-II' of FIG. 17.
Figure 20:
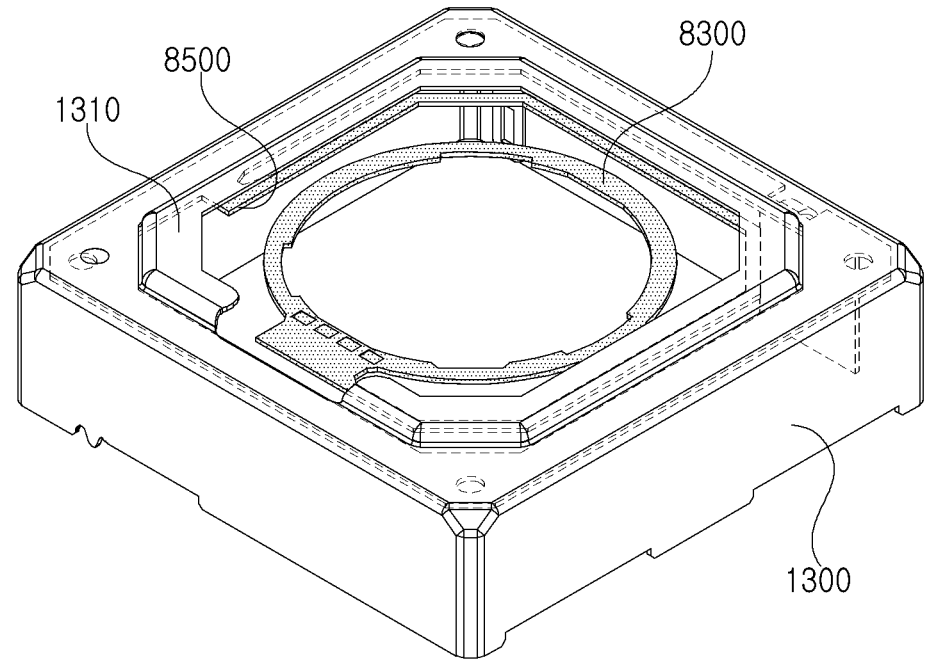
FIG. 20 is a perspective view of a state in which a connection substrate and a case are coupled according to another example embodiment.
Figure 21:
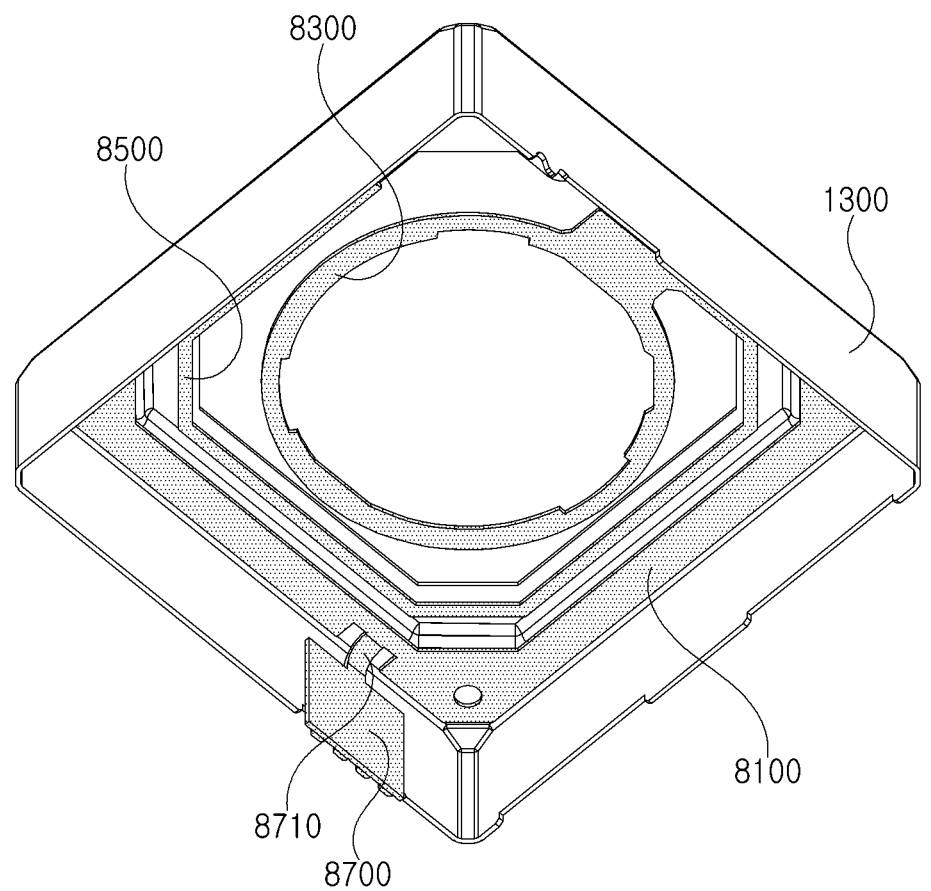
FIG. 21 is a bottom perspective view of FIG. 20.

Furthermore, FIG. 19 is a cross-sectional view taken along line II-II' of FIG. 17, FIG. 20 is a perspective view of a state in which a connection substrate and a case are coupled according to another example embodiment, and FIG. 21 is a bottom perspective view of FIG. 20.

Referring to FIGS. 12 and 16, a camera actuator 3 includes a connection substrate 8000. The connection substrate 8000 may connect an aperture substrate 540 of an aperture module 2 and a printed circuit board 9200 of an image sensor module 9000.

That is, the aperture substrate 540 may receive power through the connection substrate 8000.

The connection substrate 8000 includes a fixed portion 8100, a moving portion 8300, and a support portion 8500. The connection substrate 8000 may be an RF PCB (Rigid-Flexible Printed Circuit Board).

The moving portion 8300 is disposed inside the fixed portion 8100, and the support portion 8500 may be arranged between the fixed portion 8100 and the moving portion 8300.

The fixed portion 8100 is coupled to a case 1300 of the camera actuator 3. For example, the fixed portion 8100 may be mounted on an internal surface of the case 1300. The fixed portion 8100 is a fixed member fixed to the case 1300. The fixed portion 8100 may be a rigid printed circuit board (Rigid PCB). Furthermore, the fixed portion 8100 may have a square frame shape.

A connection portion 8700 extending in the optical axis (Z-axis) direction may be disposed on one side of the fixed portion 8100. The connection portion 8700 is connected to the printed circuit board 9200 of the image sensor module 9000.

The moving portion 8300 is coupled to the aperture module 2. For example, the moving portion 8300 may be mounted on the base 400 of the aperture module 2. The moving portion 8300 is a moving member that can move, along with the aperture module 2. The moving portion 8300 may be a rigid printed circuit board (Rigid PCB). Furthermore, the moving portion 8300 may have a ring shape.

A portion of the moving portion 8300 may be coupled to the aperture substrate 540 of the aperture module 2. For example, a portion of the moving portion 8300 may be coupled to a first extension portion 541 of the aperture substrate 540.

A connection pad is disposed on one side of the moving portion 8300, and the aperture substrate 540 may be coupled to the connection pad of the moving portion 8300.

For example, the connection pads are disposed on the moving portion 8300 and the first extension portion 541 of the aperture substrate 540, respectively, and the connection pad of the first extension portion 541 and the connection pad of the moving portion 8300 are solder-bonded to each other.

In another embodiment, the connection pad may be disposed in one of the moving portion 8300 and the first extension portion 541, and a connector may be disposed in the other one. Furthermore, the connection pad and connector may be connected to each other.

The support portion 8500 is disposed between the moving portion 8300 and the fixed portion 8100, and may connect the moving portion 8300 to the fixed portion 8100. For example, one side of the support portion 8500 is connected to the moving portion 8300, and the other side of the support portion 8500 is connected to the fixed portion 8100.

The support portion 8500 may be a flexible printed circuit board (Flexible PCB). When the moving portion 8300 is moved, the support portion 8500 disposed between the moving portion 8300 and the fixed portion 8100 may be bent.

The support portion 8500 extends along a circumferential surface of at least a portion of the moving portion 8300. The support portion 8500 may have a single bridge shape or a plurality of bridge shapes.

The support portion 8500 may have a shape that is curved at least once.

Since the support portion 8500 is configured to be bendable, power may be stably supplied to the aperture module 2 even if the aperture module 2 is moved together with the lens module 2000.

Meanwhile, since the aperture module 2 can be moved, along with the lens module 2000, a magnet portion 510 and a coil portion 520 included in the aperture module 2 may also be moved, along with the lens module 2000.

Accordingly, even if the lens module 2000 is moved, a gap between the magnet portion 510 and the coil portion 520 of the aperture module 2 may be maintained, thereby improving driving stability of the aperture module 2.

The fixed portion 8100 is coupled to the case 1300. For example, the fixed portion 8100 may be mounted on an upper internal surface of the case 1300.

The case 1300 may include a step portion 1310. The step portion 1310 may be disposed in a position to cover at least a portion of the support portion 8500 of the connection substrate 8000 in the optical axis (Z-axis) direction.

The step portion 1310 extends from an upper surface of the case 1300 in the optical axis (Z-axis) direction (a vertical direction) and may have a shape that is curved and extended toward the optical axis (Z-axis).

The step portion 1310 (e.g., a surface curved and extended toward the optical axis (Z-axis)) and the support portion 8500 of the connection substrate 8000 may face each other in the optical axis (Z-axis) direction.

When the aperture module 2 is moved, along with the lens module 2000, the support portion 8500 of the connection substrate 8000 may be bent. In this case, the step portion 1310 may limit a range in which the support portion 8500 of the connection substrate 8000 is bent. Accordingly, the support portion 8500 of the connection substrate 8000 may be prevented from being excessively deformed.

The connection substrate 8000 may include a connection portion 8700 and a bent portion 8710. The connection portion 8700 is connected to the fixed portion 8100 by the bent portion 8710 and may extend in the optical axis (Z-axis) direction. The connection portion 8700 of the connection substrate 8000 may be mounted on an internal surface of the case 1300. Furthermore, an end of the connection portion 8700 may be connected to the printed circuit board 9200 of the image sensor module 9000.

The bent portion 8710 is configured to connect the connection portion 8700 and the fixed portion 8100 to each other, and at least a portion of the bent portion 8710 may be curved to have a curvature. The bent portion 8710 may be spaced apart from the case 1300.

Figure 22:
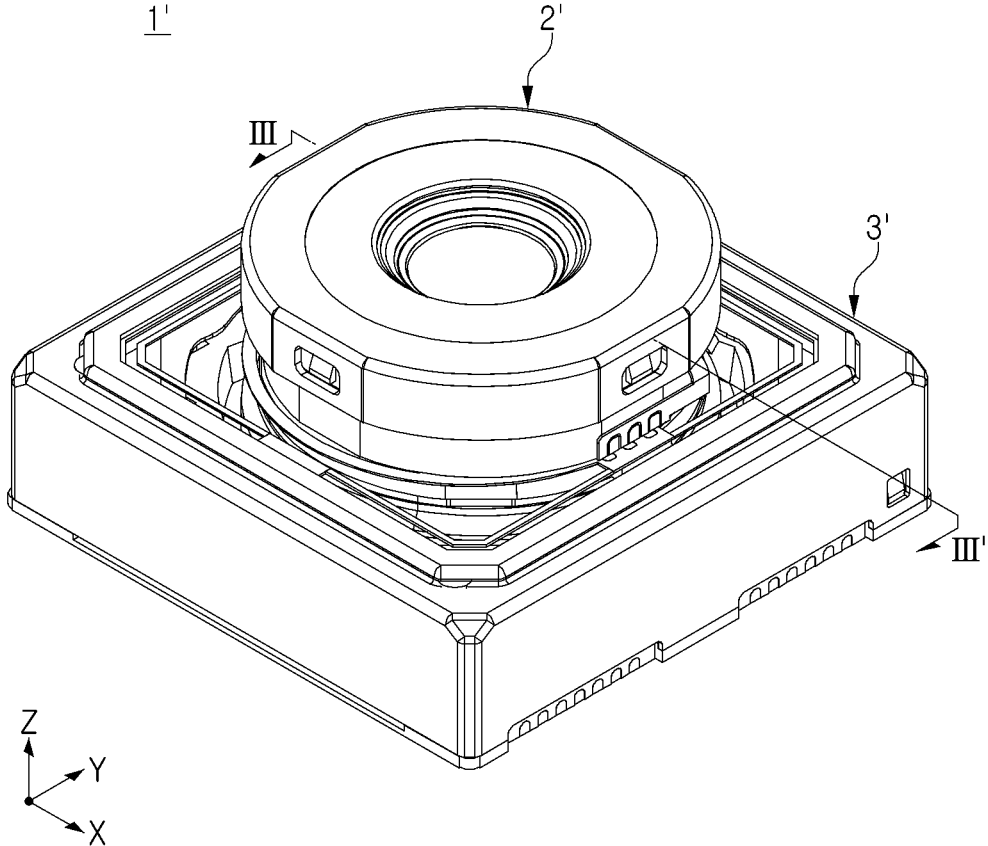
FIG. 22 is a perspective view of a camera module according to another example embodiment of the present disclosure.
Figure 23:
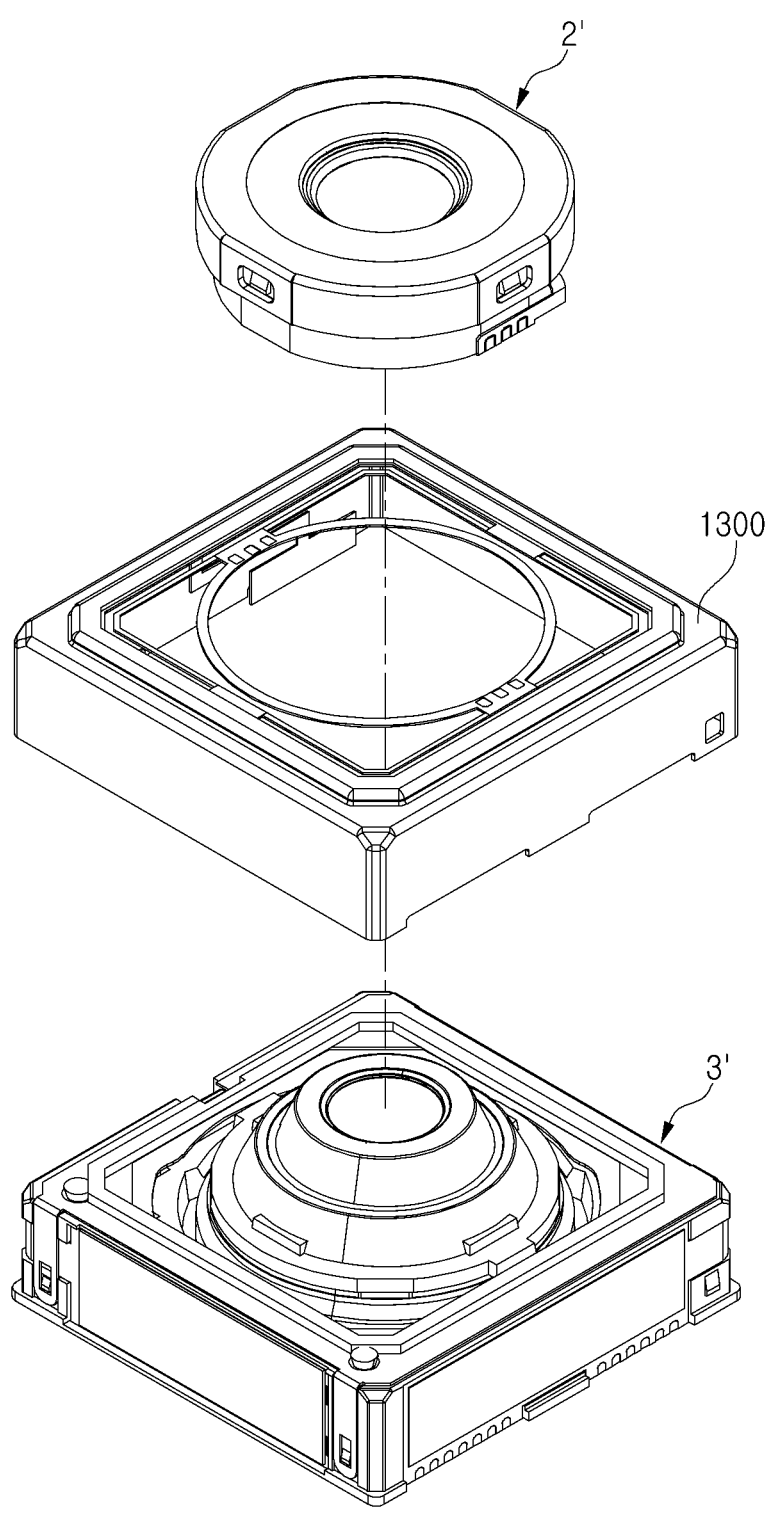
FIG. 23 is a partially-exploded perspective view of a camera module according to another example embodiment of the present disclosure.

FIG. 22 is a perspective view of a camera module according to another example embodiment of the present disclosure, and FIG. 23 is a partially-exploded perspective view of a camera module according to another example embodiment of the present disclosure.

Figure 24:
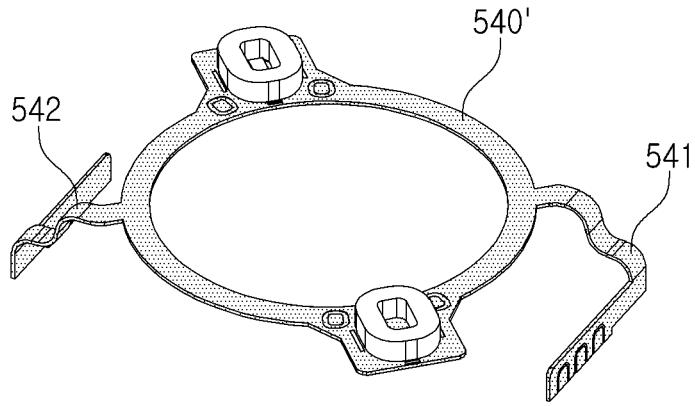
FIG. 24 is a perspective view of an aperture substrate of a camera module according to another example embodiment of the present disclosure.
Figure 25:
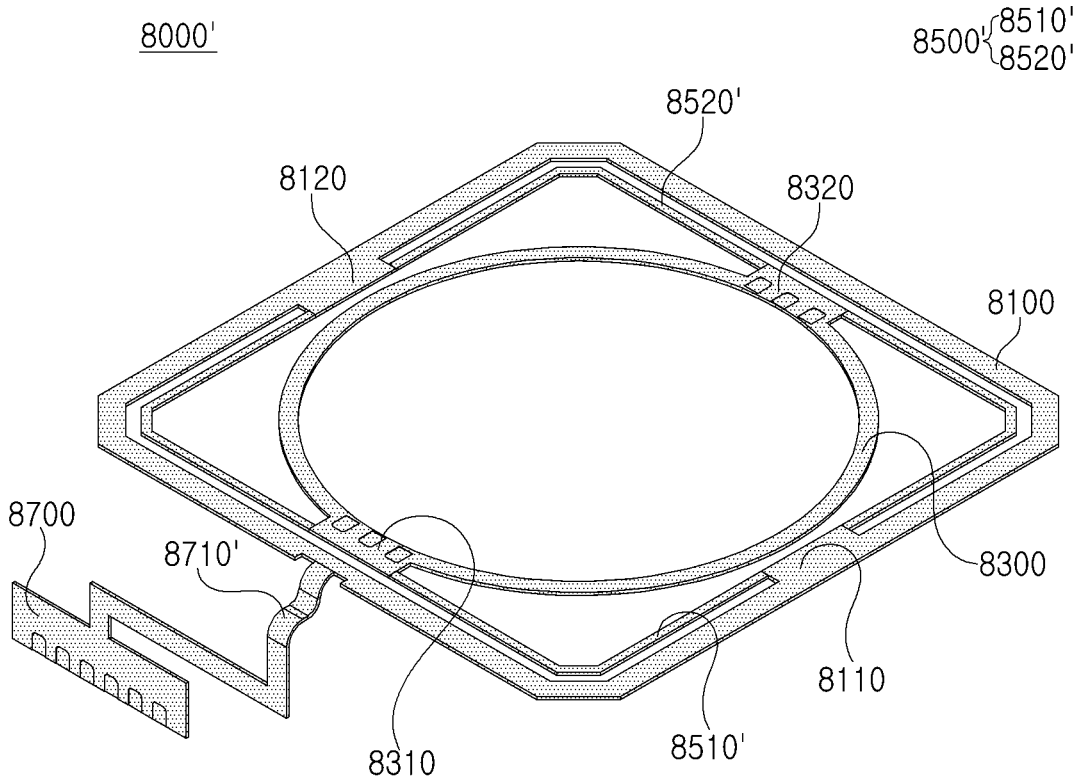
FIG. 25 is a perspective view of a connection substrate of a camera module according to another example embodiment of the present disclosure.

Furthermore, FIG. 24 is a perspective view of an aperture substrate of a camera module according to another example embodiment of the present disclosure, and FIG. 25 is a perspective view of a connection substrate of a camera module according to another example embodiment of the present disclosure.

Figure 26:
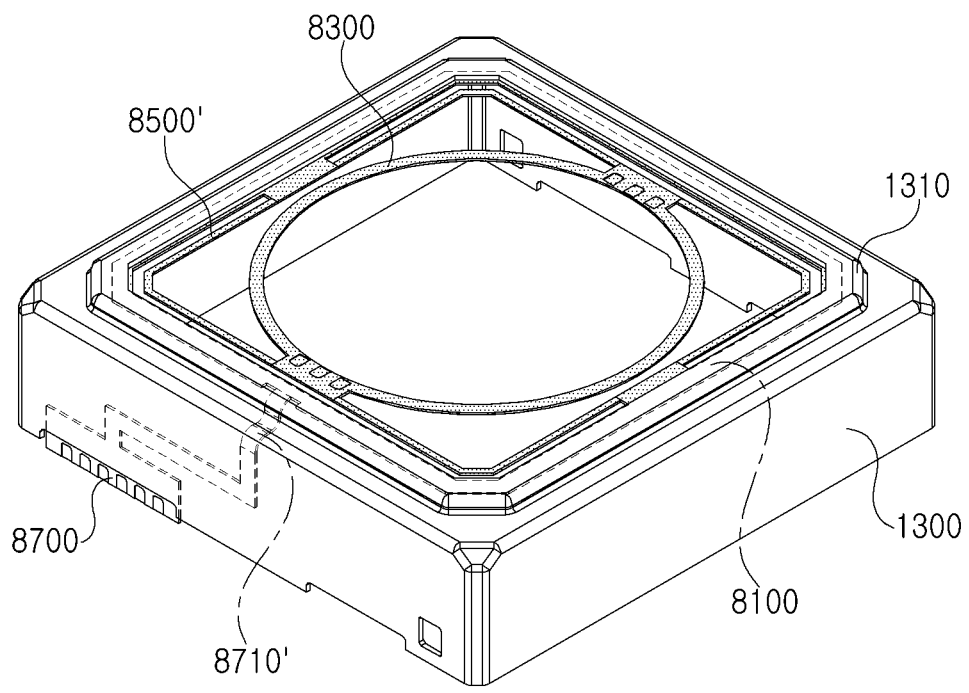
FIG. 26 is a perspective view illustrating a state in which a connection substrate and a case of a camera module according to another example embodiment of the present disclosure are coupled.
Figure 27:
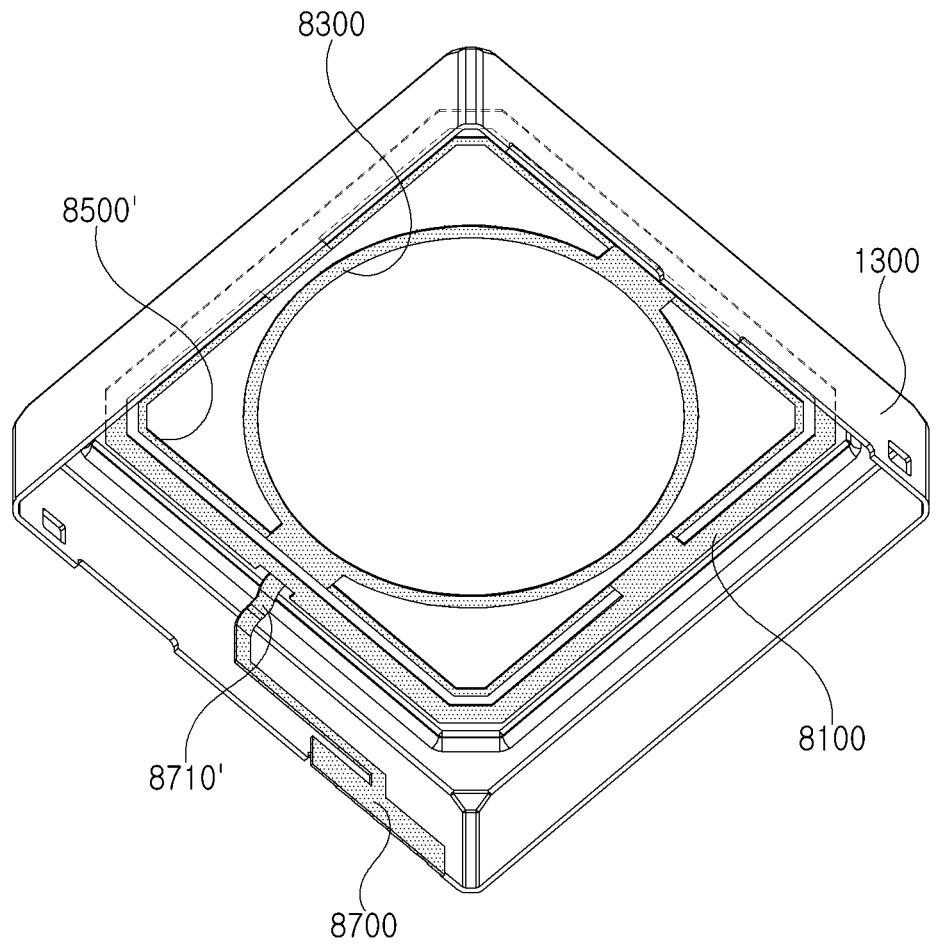
FIG. 27 is a bottom perspective view of FIG. 26.
Figure 28:
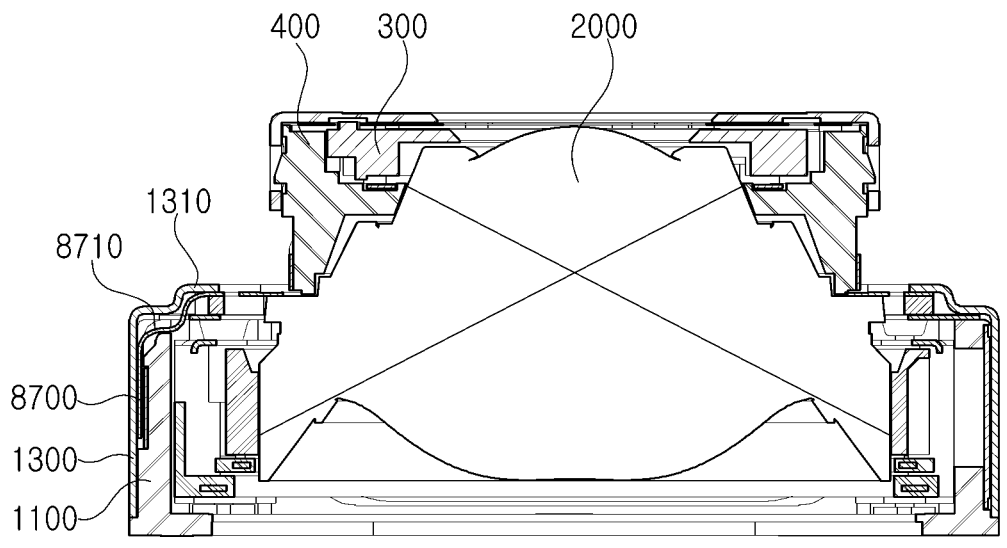
FIG. 28 is a cross-sectional view taken along line III-III' of FIG. 22.

Furthermore, FIG. 26 is a perspective view illustrating a state in which a connection substrate and a case of a camera module according to another example embodiment of the present disclosure are coupled, FIG. 27 is a bottom perspective view of FIG. 26, and FIG. 28 is a cross-sectional view taken along line III-III' of FIG. 22.

Referring to FIGS. 22 to 28, a camera module 1' according to another example embodiment of the present disclosure includes an aperture module 2' and a camera actuator 3'.

When compared to example embodiment described with reference to FIGS. 1 to 21, since the configurations other than the aperture substrate 540' and the connection substrate 8000' are similar, only the aperture substrate 540' and the connection substrate 8000' will be described.

A coil portion 520 is disposed on the aperture substrate 540', and the aperture substrate 540' is mounted on an upper surface of the base 400.

Furthermore, the aperture substrate 540' includes a first extension portion 541 extending from the upper surface of the base 400 to a side surface of the base 400, and a second extension portion 542 disposed on an opposite side of the first extension portion 541. Each of the first extension portion 541 and the second extension portion 542 may be connected to the connection substrate 8000'.

Referring to FIGS. 25 to 28, the connection substrate 8000' includes a fixed portion 8100, a moving portion 8300, and a support portion 8500'. The connection substrate 8000' may be an RF PCB.

The moving portion 8300 is disposed inside the fixed portion 8100, and the support portion 8500' may be disposed between the fixed portion 8100 and the moving portion 8300.

The fixed portion 8100 is coupled to the case 1300 of the camera actuator 3'. For example, the fixed portion 8100 may be mounted on an internal surface of the case 1300. The fixed portion 8100 is a fixed member fixed to the case 1300. The fixed portion 8100 may be a rigid printed circuit board (Rigid PCB). Furthermore, the fixed portion 8100 may have a square frame shape.

A connection portion 8700 extending in the optical axis (Z-axis) direction may be disposed on one side of the fixing portion 8100. The connection portion 8700 may be connected to the printed circuit board 9200 of the image sensor module 9000.

The moving portion 8300 is coupled to the aperture module 2'. For example, the moving portion 8300 may be mounted on the base 400 of the aperture module 2'. The moving portion 8300 is a moving member that can move, along with the aperture module 2'. The moving portion 8300 may be a rigid printed circuit board (Rigid PCB). Furthermore, the moving portion 8300 may have a ring shape.

A portion of the moving portion 8300 may be coupled to the aperture substrate 540' of the aperture module 2'. For example, a portion of the moving portion 8300 may be coupled to a first extension portion 541 and a second extension portion 542 of the aperture substrate 540'.

Connection pads are disposed on one side and the other side of the moving portion 8300, and the aperture substrate 540' may be coupled to the connection pads of the moving portion 8300.

For example, the connection pads may be disposed on one side and the other side of the moving portion 8300, respectively, and the connection pads may be disposed in the first extension portion 541 and the second extension portion 542 of the aperture substrate 540', respectively. Furthermore, the moving portion 8300 and the aperture substrate 540' may be solder-bonded to each other.

In another example embodiment, the connection pad may be disposed in the moving portion 8300, and connectors may be disposed on the first extension portion 541 and the second extension portion 542, respectively, (and vice versa).

The support portion 8500' is disposed between the moving portion 8300 and the fixed portion 8100, and may connect the moving portion 8300 and the fixed portion 8100. The support portion 8500' may be a flexible printed circuit board (Flexible PCB). When the moving portion 8300 is moved, the support portion 8500' disposed between the moving portion 8300 and the fixed portion 8100 may be bent.

The support portion 8500' extends along an internal circumferential surface of the fixing portion 8100. The support portion 8500' may have a single bridge shape or a plurality of bridge shapes.

One portion of the support portion 8500' is connected to the moving portion 8300, and the other portion of the support portion 8500 is connected to the fixed portion 8100.

The fixed portion 8100 includes a first coupling portion 8110 and a second coupling portion 8120, and the moving portion 8300 includes a third coupling portion 8310 and a fourth coupling portion 8320.

Connection pads may be disposed in the third coupling portion 8310 and the fourth coupling portion 8320, respectively.

The first coupling portion 8110 and the second coupling portion 8120 may have a shape protruding from the fixed portion 8100 to the moving portion 8300, and the third coupling portion 8310 and the fourth coupling portion 8320 may have a shape protruding from the moving portion 8300 to the fixed portion 8100.

A virtual line for connecting the first coupling portion 8110 and the second coupling portion 8120 and a virtual line for connecting the third coupling portion 8310 and the fourth coupling portion 8320 may be perpendicular to each other.

The support portion 8500' is connected to the fixed portion 8100 through the first coupling portion 8110 and the second coupling portion 8120. Furthermore, the support portion 8500' is connected to the moving portion 8300 through the third coupling portion 8310 and the fourth coupling portion 8320.

For example, the first coupling portion 8110 and the second coupling portion 8120 protrude and extend from the fixed portion 8100 and are spaced apart from the moving portion 8300. Furthermore, the third coupling portion 8310 and the fourth coupling portion 8320 protrude and extend from the moving portion 8300 and are spaced apart from the fixed portion 8100.

The support portion 8500' extends along an internal circumferential surface of the fixing portion 8100 and is connected to the first coupling portion 8110 to the fourth coupling portion 8320.

In an example embodiment, the first coupling portion 8110 and the second coupling portion 8120 may be spaced apart in the second axis (Y-axis) direction. Furthermore, the third coupling portion 8310 and the fourth coupling portion 8320 may be spaced apart in the first axis (X-axis) direction.

Accordingly, the moving portion 8300 may be moved while being elastically supported by the support portion 8500'.

The fixed portion 8100 is coupled to the case 1300. For example, the fixed portion 8100 may be mounted on an upper internal surface of the case 1300.

The case 1300 may include a step portion 1310. The step portion 1310 extends from an upper surface of the case 1300 in the optical axis (Z-axis) direction (a vertical direction) and may have a shape that is curved and extended toward the optical axis (Z-axis).

The fixed portion 8100 may be coupled to the step portion 1310 (e.g., a surface curved and extended toward the optical axis (Z-axis)).

The connection substrate 8000' may include a connection portion 8700 and a bent portion 8710'. The connection portion 8700 is connected to the fixed portion 8100 by the bent portion 8710' and may extend in the optical axis (Z-axis) direction.

The connection portion 8700 of the connection substrate 8000' may be mounted on an internal surface of the case 1300. Furthermore, an end of the connection portion 8700 may be connected to the printed circuit board 9200 of the image sensor module 9000.

The bent portion 8710' is configured to connect the connection portion 8700 and the fixing portion 8100 to each other, and may be bent so that at least a portion of the bent portion 8710' has a curvature. For example, the bent portion 8710' may be bent at least three times. The bent portion 8710' may be spaced apart from the case 1300.

Figure 29:
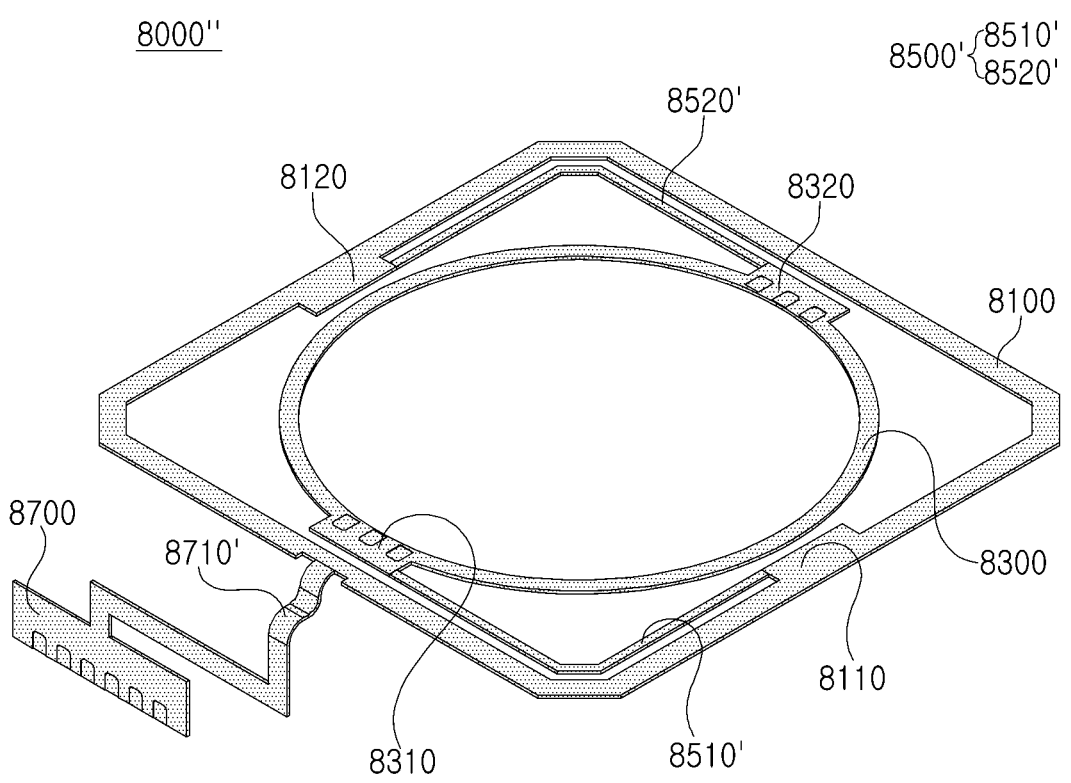
FIGS. 29 and 30 are modified examples of a connection substrate of a camera module according to another example embodiment of the present disclosure.
Figure 30:
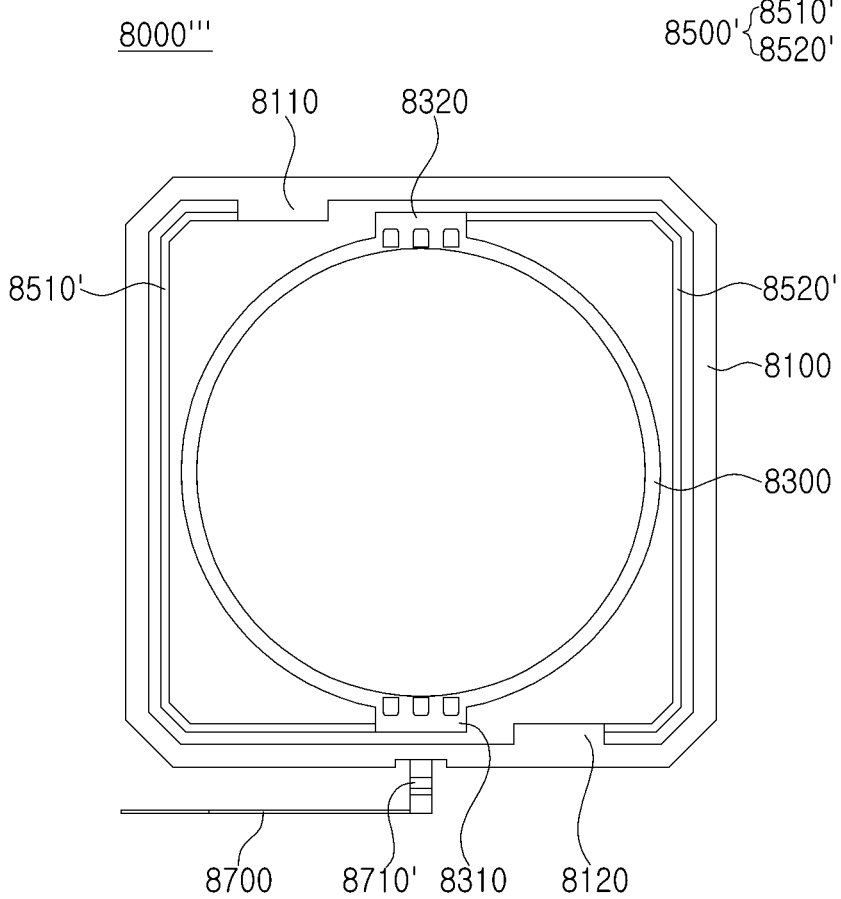

FIGS. 29 and 30 are modified examples of a connection substrate of a camera module according to another example embodiment of the present disclosure.

Referring to FIG. 29, a support portion 8500' of a connection substrate 8000'' includes a first support portion 8510' and a second support portion 8520'.

The first support portion 8510' extends between the first coupling portion 8110 and the third coupling portion 8310, and one side of the first support portion 8510' is connected to the first coupling portion 8110, and the other side of the first support portion 8510' is connected to the third coupling portion 8310.

The second support portion 8520' extends between the second coupling portion 8120 and the fourth coupling portion 8320, and one side of the second support portion 8520' is connected to the second coupling portion 8120, and the other side of the second support portion 8520' is connected to the fourth coupling portion 8320.

Referring to FIG. 30, a first coupling portion 8110 of a connection substrate 8000''' may be disposed adjacent to the fourth coupling portion 8320. Furthermore, the second coupling portion 8120 may be disposed adjacent to the third coupling portion 8310.

For example, the first coupling portion 8110 and the fourth coupling portion 8320 may be disposed so that at least a portion thereof overlaps each other in the first axis (X-axis) direction or the second axis (Y-axis) direction.

Furthermore, the second coupling portion 8120 and the third coupling portion 8310 may be disposed so that at least a portion thereof overlaps each other in the first axis (X-axis) direction or the second axis (Y-axis) direction.

The first support portion 8510' extends between the first coupling portion 8110 and the third coupling portion 8310, and one side of the first support portion 8510' is connected to the first coupling portion 8110, and the other side of the first support portion 8510' is connected to the third coupling portion 8310.

The second support portion 8520' extends between the second coupling portion 8120 and the fourth coupling portion 8320, and one side of the second support portion 8520' is connected to the second coupling portion 8120, and the other side of the second support portion 8520' is connected to the fourth coupling portion 8320.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module configured to move in one or more of an optical axis direction, a first axis direction perpendicular to the optical axis direction, and a second axis direction perpendicular to both the optical axis direction and the first axis direction;
   a housing configured to accommodate the lens module;
   a case coupled to the housing;
   a printed circuit board coupled to the housing;
   an aperture module configured to form an incident opening of various sizes, and coupled to the lens module and moved together with the lens module; and
   a connection substrate connected to the printed circuit board and the aperture module,
   wherein the aperture module comprises an aperture driver comprising a magnet portion and a coil portion, and an aperture substrate in which the coil portion is disposed, and
   wherein the connection substrate comprises a fixed portion mounted on the case and fixed to the housing, a moving portion connected to the aperture substrate, and a support portion connecting the fixed portion and the moving portion.

2. The camera module according to claim 1, wherein the support portion is disposed between the fixed portion and the moving portion, extends along a circumferential surface of at least a portion of the moving portion, and has a shape that is curved at least once.

3. The camera module according to claim 1, wherein connection pads are disposed on the aperture substrate and the moving portion, respectively, and the connection pad of the aperture substrate and the connection pad of the moving portion are solder-bonded to each other.

4. The camera module according to claim 1, wherein the connection substrate further comprises a connection portion mounted on an internal surface of the case, and a bent portion connecting the connection portion to the fixed portion, and
   wherein the bent portion is spaced apart from the case and has a curved shape providing curvature.

5. The camera module according to claim 1, wherein the case includes a step portion formed on an upper surface thereof, and
   wherein the step portion has a surface facing at least a portion of the support portion in the optical axis direction.

6. The camera module according to claim 1, further comprising:
   a carrier having the lens module disposed therein, and accommodated in the housing;
   a first stopper coupled to the carrier, and disposed to cover at least a portion of the lens module; and
   a second stopper coupled to the housing, and disposed to cover at least a portion of the first stopper.

7. The camera module according to claim 6, wherein at least a portion of the first stopper faces the support portion downwardly in the optical axis direction.

8. The camera module according to claim 1, wherein the lens module includes a lens barrel and a lens holder coupled to the lens barrel,
   wherein a first bonding groove and a second bonding groove are disposed on an internal surface of the lens holder, and
   wherein a partition wall is disposed between the first bonding groove and the second bonding groove.

9. The camera module according to claim 8, wherein the lens barrel is bonded to the lens holder by an adhesive applied to the first bonding groove.

10. The camera module according to claim 8, wherein the aperture module is bonded to the lens barrel and the lens holder by an adhesive applied to the second bonding groove.

11. The camera module according to claim 10, wherein a lower surface of the aperture module is bonded to an upper surface of the lens barrel through the adhesive.

12. The camera module according to claim 8, wherein the aperture module includes a support protrusion extending in the optical axis direction and disposed in the second bonding groove, and
   wherein the support protrusion is spaced apart from an internal surface of the second bonding groove and an external surface of the lens barrel while being disposed in the second bonding groove.

13. The camera module according to claim 1, wherein the aperture module and the lens module move together in the optical axis direction, the first axis direction, and the second axis direction.

14. The camera module according to claim 1, wherein an image sensor is disposed on the printed circuit board, and at least a portion of the connection substrate is flexible.

15. A camera module comprising:
   a lens module configured to move in one or more of an optical axis direction, a first axis direction perpendicular to the optical axis direction, and a second axis direction perpendicular to both the optical axis direction and the first axis direction;
   a housing configured to accommodate the lens module;
   a case coupled to the housing;

an aperture module configured to form an incident opening of various sizes, and coupled to the lens module and moved together with the lens module; and a connection substrate comprising a moving portion coupled to the aperture module, a fixed portion mounted on the case and fixed to the housing, and a support portion connecting the moving portion to the fixed portion.

16. The camera module according to claim 15, wherein the connection substrate further comprises a connection portion extending downwardly in the optical axis direction and a bent portion connecting the connection portion to the fixed portion, and wherein the bent portion is spaced apart from the case and has a curved shape providing curvature.

17. The camera module according to claim 16, further comprising:

a printed circuit board coupled to the housing and having an image sensor disposed therein, wherein an end of the connection portion is coupled to the printed circuit board.

18. The camera module according to claim 15, further comprising:

a carrier having the lens module disposed therein, and accommodated in the housing;

a first stopper coupled to the carrier, and disposed to cover at least a portion of the lens module; and a second stopper coupled to the housing, and disposed to cover at least a portion of the first stopper, wherein at least a portion of the first stopper is disposed to face the support portion in the optical axis direction, and wherein at least a portion of the second stopper is disposed to face the fixed portion in the optical axis direction.

19. The camera module according to claim 15, wherein the case includes a step portion formed on an upper surface thereof, and the step portion has a surface facing at least a portion of the support portion in the optical axis direction.

20. A camera module comprising:

a lens module;

a housing configured to accommodate the lens module;

a case coupled to the housing;

an aperture module configured to form an incident opening of various sizes, and disposed on the lens module; and a connection substrate comprising a fixed portion mounted on the case and fixed to the housing, a moving portion coupled to the aperture module and configured to move relative to the fixed portion, and a support portion connecting the moving portion to the fixed portion.

21. The camera module according to claim 20, wherein the lens module is configured to move in one or more of an optical axis direction, a first axis direction perpendicular to the optical axis direction, and a second axis direction perpendicular to both the optical axis direction and the first axis direction.

22. The camera module according to claim 20, further comprising:

a printed circuit board coupled to the housing, wherein the aperture module comprises an aperture driver comprising a magnet portion and a coil portion, and an aperture substrate in which the coil portion is disposed, and wherein one side of the connection substrate is coupled to the aperture substrate, and another side thereof is coupled to the printed circuit board.

* * * * *